Nov. 30, 1965    G. F. SKALA    3,221,143
TEMPERATURE CONTROL SYSTEM
Filed June 25, 1963    5 Sheets-Sheet 1

INVENTOR.
George F Skala
BY
Brumbley, Baird Clayton,
Miller & Vogel,
Attys.

Nov. 30, 1965     G. F. SKALA     3,221,143

TEMPERATURE CONTROL SYSTEM

Filed June 25, 1963     5 Sheets-Sheet 2

INVENTOR.
George F. Skala
BY
Prangley, Baird, Clayton,
Miller & Vogel,
Attys.

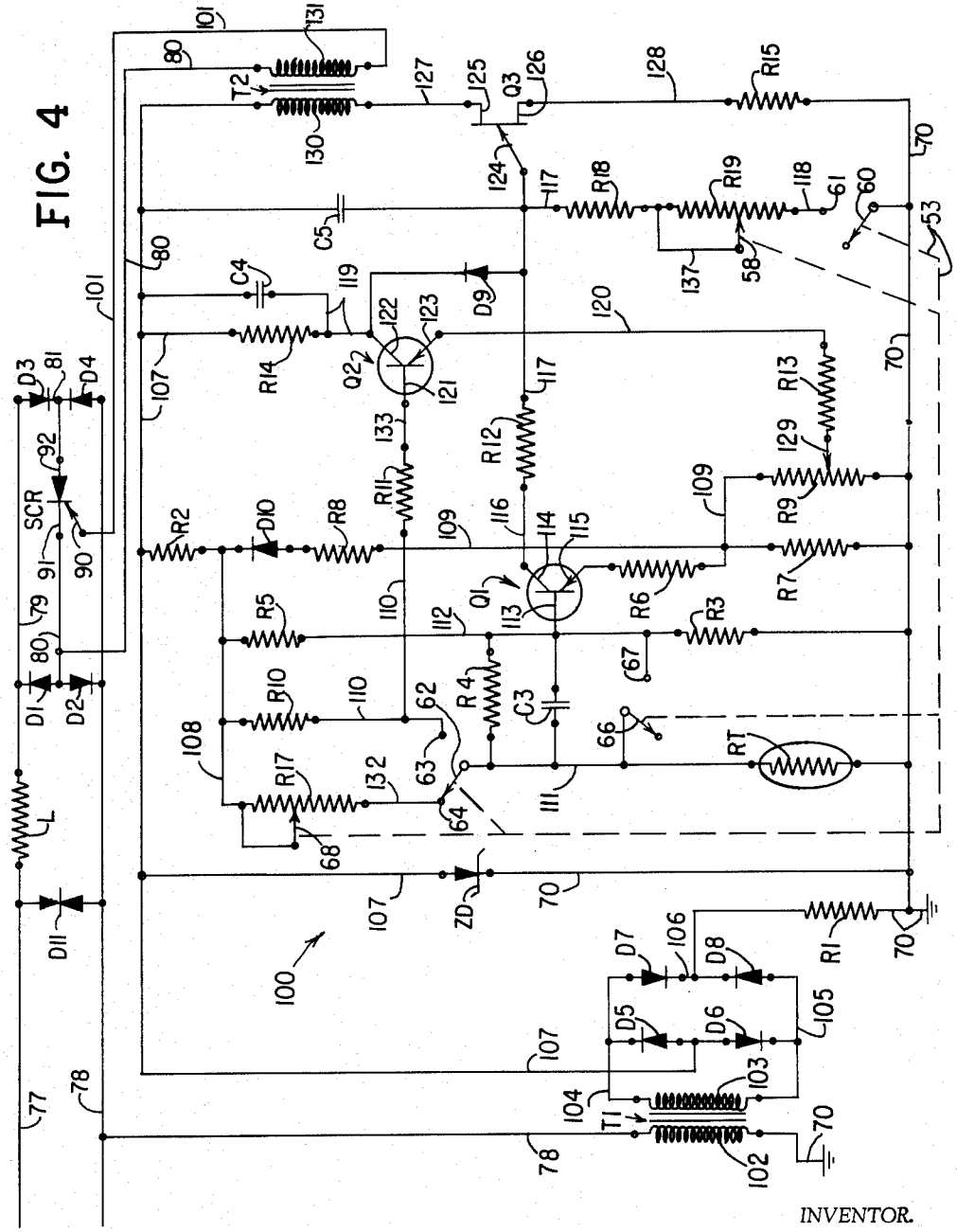

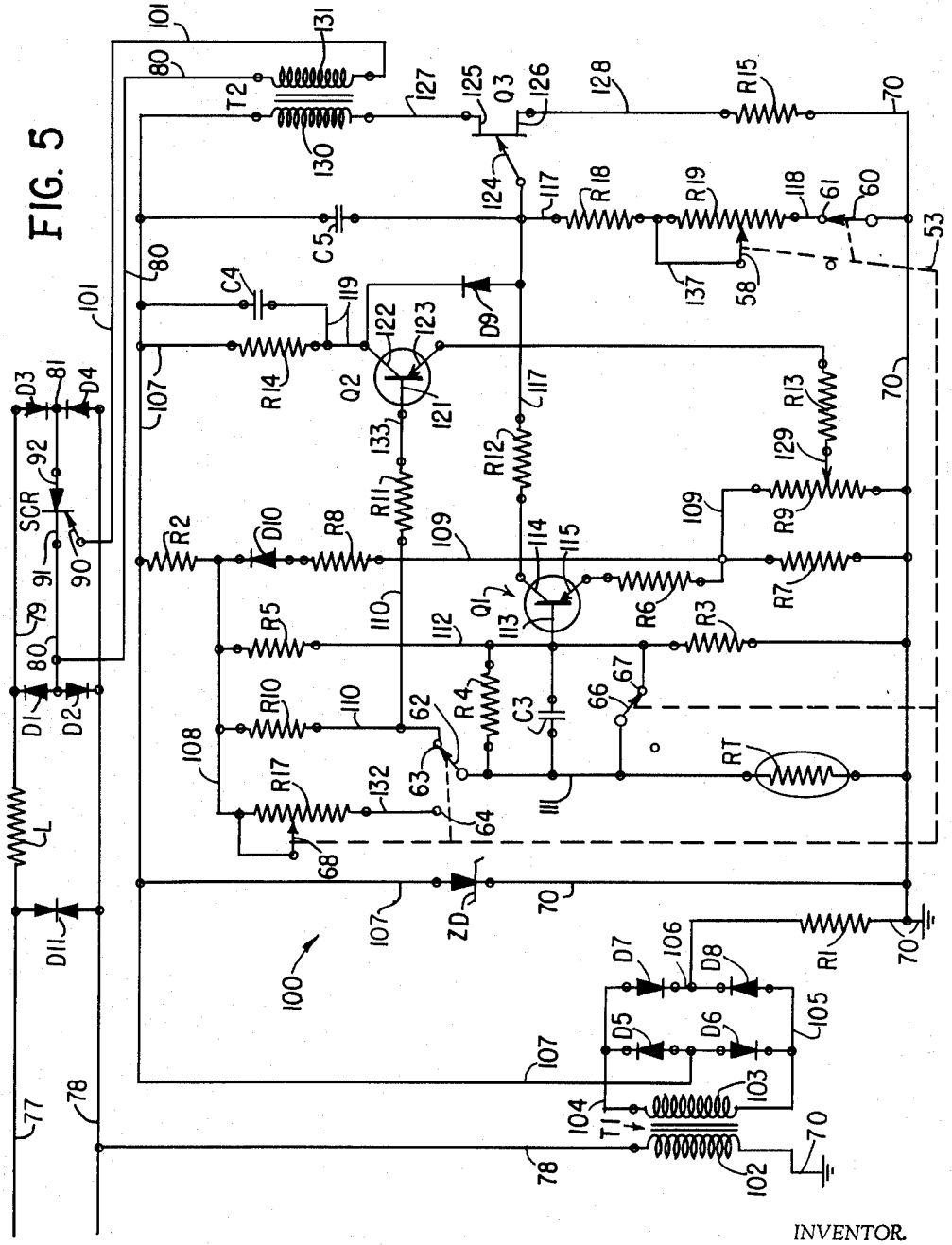

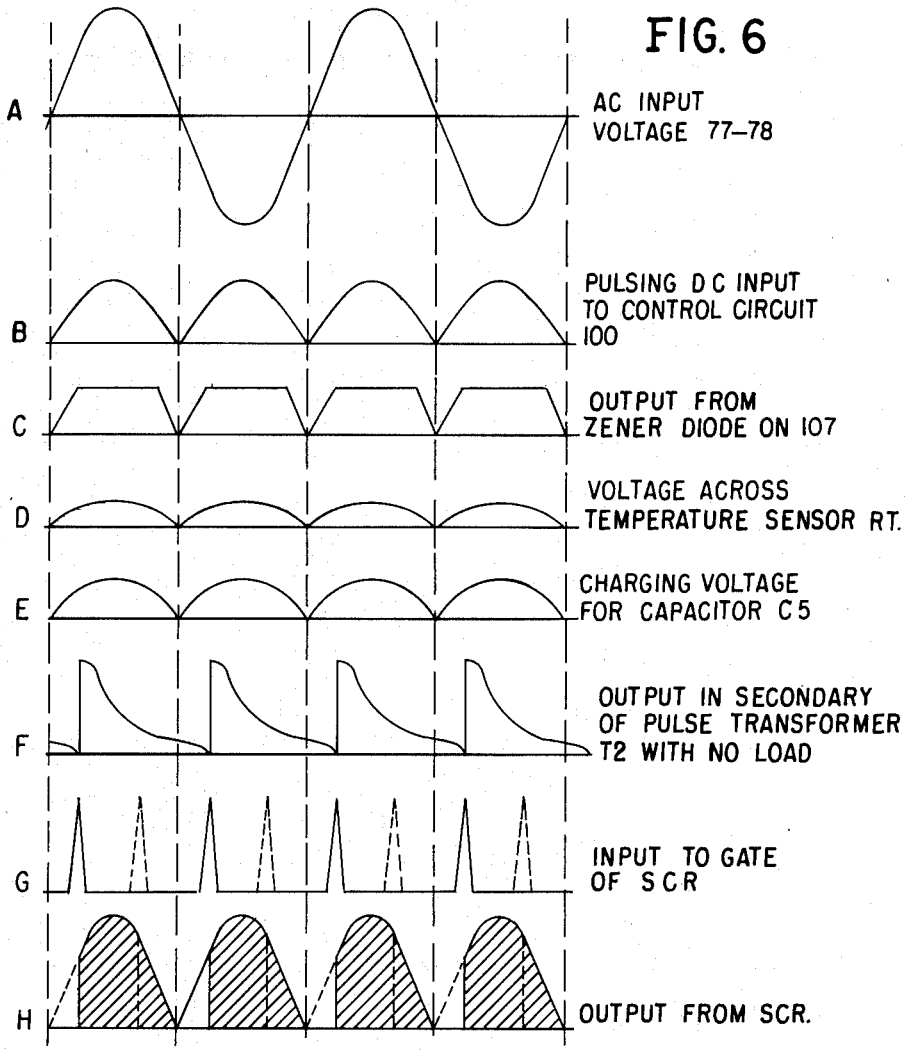

United States Patent Office 3,221,143
Patented Nov. 30, 1965

3,221,143
TEMPERATURE CONTROL SYSTEM
George F. Skala, Scotia, N.Y., assignor to General Electric Company, a corporation of New York
Filed June 25, 1963, Ser. No. 290,355
30 Claims. (Cl. 219—489)

The present invention relates to electric control systems, and more particularly, to improved automatic temperature control systems for electric heating apparatus, and specifically to such automatic temperature control systems for cooking vessels heated by electric heating units or hotplates, and particularly of the type having a temperature sensing member in position to contact the surface of the cooking vessel being heated.

The automatic temperature control system of the present invention is of the type used with a solid state controlled rectifier and wherein a first manually operable controller is operable to set a desired operating temperature of the electric heating unit, the temperature sensing unit cooperating with the other components of the control system to control the electrical input to the electric heating unit to maintain the temperature of the cooking vessel at that set by the first controller. A second manually operable controller is provided to be used when boiling liquids upon the electric heating unit, the second controller being operative to set different desired rates of heat input to the liquid being heated by the electric heating unit during the boiling of the liquid. In the construction, the first and second controllers are operated by a single manual dial.

It is an important object of the present invention to provide an improved electric control system for controlling electric heating units of the type set forth including the temperature sensing unit and the first manually operable controller, the electric control system incorporating therein a lead network responsive to rapid changes in the difference between the temperature sensed by the temperature sensing unit and the temperature setting of the first controller for operating the electric heating unit to minimize overshooting of the temperature set by the first controller.

In connection with the foregoing object, it is another object of the present invention to provide an electric control system of the type set forth which rapidly heats the medium to be heated by the electric heating unit until the temperature sensed by the temperature sensing unit is near that set by the first controller and thereafter reduces the electric power to the electric heating unit in an amount greater than that indicated by the difference between the temperature sensed by the temperature sensing unit and the temperature setting of the first controller to minimize overshooting of the temperature set by the first controller.

Another object of the invention is to provide an electric control system of the type set forth including the temperature sensing unit and the second manually operable controller, wherein there is provided a fixed control device operative to set a desired temperature of the liquid heated by the electric heating unit below the boiling point thereof, the electric control system being operative to cause the electric heating unit to heat the cooking vessel rapidly to the temperature set by the fixed control device and thereafter to operate the electric heating unit in a manner to provide a desired rate of heat input to the cooking vessel in accordance with the setting of the second manually operable controller.

Yet another object of the invention is to provide an electric control system of the type set forth including the temperature sensing unit and the second manually operable controller, wherein there is provided a fixed control device operative to set a maximum desired temperature of the cooking vessel heated by the electric heating unit, the electric control system being operative to cause the electric heating unit to heat the cooking vessel rapidly until boiling of the liquid in the cooking vessel and thereafter to interrupt operation of the electric heating unit when the temperature sensed by the temperature sensing unit is that set by the fixed control device.

Still another object of the invention is to provide an electric control system of the type set forth including the temperature sensing unit and the second manually operable controller, wherein there are provided a first fixed control device operative to set a desired temperature of the liquid heated by the electric heating unit below the boiling point thereof and a second fixed control device operative to set a maximum desired temperature for the cooking vessel above the boiling point of the liquid therein, the electric control system being operative to cause the electric heating unit to heat the cooking vessel rapidly to the temperature set by the first fixed control device and thereafter to operate the electric heating unit in a manner to provide a desired rate of heat input to the cooking vessel in accordance with the setting of the second manually operable controller and thereafter to interrupt operation of the electric heating unit when the temperature sensed by the temperature sensing unit reaches that set by the second fixed control device.

A further object of the invention is to provide an electric control system of the type set forth that comprises a control network of simple and economical connection and arrangement involving a minimum number of individual conventional elements and which requires no thermionic tubes or other elements which must be replaced during the normal life of the system.

A still further object of the invention is to provide an automatic electric control system of the character noted that regulates the power provided to the associated electric heating unit as demanded thereby, power being continuously provided to the heater when required and being infinitely variable from the full power input to zero power input upon demand, yet requiring no moving parts except the manually adjustable temperature selecting controllers.

Further features of the invention pertain to the particular arrangement of the elements of the electric heating apparatus and of the associated control network, whereby the above-outlined and additional operating features thereof are attained.

The invention, both as to its organization and method of operation, together with further objects and advantages thereof, will best be understood by reference to the following specification taken in connection with the accompanying drawings, in which:

FIG. 4 is a simplified schematic diagram of the electric control circuit illustrated in FIG. 3 with the control switches in the first position thereof;

FIG. 5 is a simplified schematic diagram of the electric control circuit illustrated in FIG. 3 with the switches in the second position thereof; and FIG. 6 is a graphic illustration of the voltages obtained at different points of the circuit of FIGS. 3, 4 and 5 during the operation thereof and illustrating particularly the phase relationship among the voltages.

Figure 1:
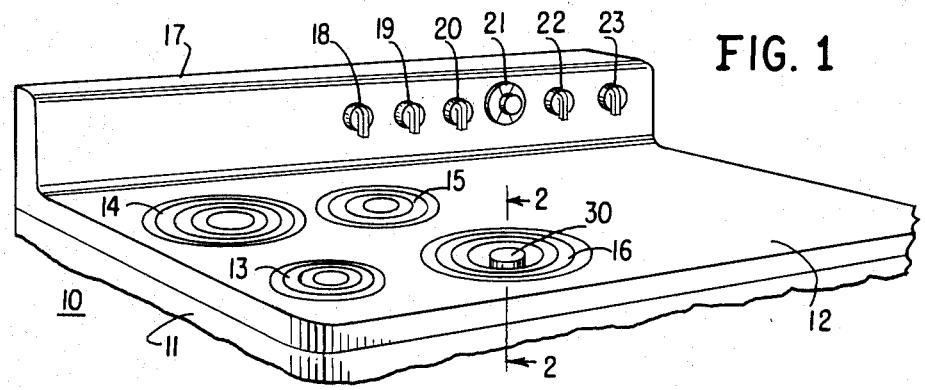
FIGURE 1 is a fragmentary front perspective view of the upper portion of an electric range incorporating therein electric heating apparatus embodying the present invention.

Referring now to FIG. 1 of the drawings, there is illustrated an electric range 10 incorporating electric heating apparatus embodying the features of the present invention and comprising an upstanding body 11 provided with a substantially horizontally disposed cooking top 12 supporting a plurality of surface heating units or hotplates 13, 14, 15 and 16 arranged in spaced-apart relationship in a substantially rectangular pattern on the left side thereof; the body 11 houses an oven, not shown, in the right-hand portion thereof, and a compartment, not shown, in the left-hand portion thereof, the oven and the compartment being respectively provided with front doors, not shown. The cooking top 12 carries an upstanding backsplash 17 adjacent to the rear thereof that in turn carries a plurality of surface heating unit selector switches 18, 19, 20 and 21, a range control switch 22, and an oven regulator thermostat switch 23, the elements 18 to 23, inclusive, being arranged in a row on the right-hand side of the backsplash 17. The selector switches 18, 19 and 20, respectively, correspond to the surface heating units 13, 14 and 15, are of conventional construction and are respectively included in the electric heating circuits thereof; while the control switch 21 corresponds to the surface heating unit 16 of special construction and is included in the electric heating circuit thereof. Each of the surface heating unit selector switches 18, 19 and 20 and the oven selector switch 22 as well as the thermostat switch 23 are of conventional construction and arrangement.

The cooking top 12 has a plurality of openings therein that respectively receive the electric heating units 13, etc.; and each of the electric heating units 13, 14 and 15 may be fundamentally of the construction disclosed in United States Patent No. 2,565,443, granted on August 21, 1951, to Oliver G. Vogel and Francis E. Kirk; while the surface heating unit 16 is of the special construction disclosed in United States Patent No. 2,813,962, granted on November 19, 1957, to George F. Skala.

The surface heating unit 16 is of the hotplate type and is mounted for pivotal movements in the associated opening provided in the cooking top 12 by mechanism, not shown, that is preferably of the construction of that disclosed in United States Patent No. 2,565,432, granted on August 21, 1951, to Francis E. Kirk. More particularly, referring to FIG. 2, the heating unit 16 comprises a spider 24 carrying a heating element L including inner and outer sections La and Lb, only a portion of the inner section La being illustrated. The heating element L is generally in the form of a helical coil or spiral, the turns of which are arranged in radially spaced-apart relation; and preferably, the heating element L is of the meal sheath-helical resistance conductor type disclosed in United States Patent No. 1,367,341, granted on February 1, 1921, to Charles C. Abbott. The coils of the heating element L are selectively staked to the arms of the spider 24 in the general manner disclosed in the Vogel and Kirk patent mentioned and the top surfaces of the coils of the heating element L are flattened to define a substantially horizontal plane adapted to engage and to support the bottom wall of a cooking vessel, or the like, not shown.

The hotplate 16 carries a temperature sensing unit 30 centrally thereof that is adapted to engage the bottom wall of the cooking vessel, or the like, supported upon the heating element L; and more particularly, an upstanding tubular heat shield or housing wall 32 is arranged centrally of the electric heating unit 16 and in cooperation with a top member 31 forms an enclosing fluid-tight housing, the upper end of the wall 32 being bent over and provided with a flange 33 engaging the top member 31.

The lower end of the housing wall 32 has an inwardly directed integral flange 34 thereon which supports a bearing plate 35 and an inner cylindrical shield 36 thereon, tabs 37 being formed on the lower edges of the shield 36 and fixedly secured to the bottom wall 34. The top member 31 includes downwardly projecting portions 38 that rest upon the bearing plate 35, suitable fasteners 39 mounting the member 31 upon the bearing plate 35 for movement therewith. The entire upper end of the temperature sensing unit 30 including the top member 31 and the housing 32 and the bearing plate 35 is mounted upon a shaft 40 extending vertically and generally centrally of the heating unit 16, the shaft 40 carrying on the upper end thereof a ball 21 which is received within a socket formed by cooperating portions of the bearing plate 35 and the inner shield 36, whereby the top member 31 and all of the associated parts are free to pivot and rotate about the center of the ball 41. The shaft 40 is supported within a tube 42 and is fixedly to secured thereto by a set screw 42a, the tube 42 in turn being supported within a larger tube 43 having an inturned upper flange 43a thereon engaging the upper surface of an outwardly extending flange 44 on the tube 42 adjacent to the upper end thereof. The lower end of the outer tube 43 is threaded externally and receives thereon a threaded cap 46 having an opening centrally thereof to receive the lower end of the inner tube 42 therethrough, a coiled spring 45 under compression being dispensed between the flange 44 on the inner tube 42 and the cap 46 engaging the outer tube 43, whereby resiliently to urge the inner tube 42 upwardly with respect to the outer tube 43. The outer tube 43 is suitably clamped to the stove body 11 as by a member 47. Mounted in the top member 31 is a sensing button 48 including a temperature sensing resistor RT.

In the arrangement, the heat shields and housing members 32 and 36 are preferably formed of stainless steel or other bright and reflective material; while the sensing button 48 is formed of aluminum, or the like, so that it constitutes a good heat conductor capable of following closely the temperature of the bottom wall of a cooking vessel, or the like, supported by the heating element L. The top member 31, the housings 32 and 36 and the sensing button 48 are movable as a unit with respect to the heating element L by virtue of the ball and socket joined including the ball 41 and by virtue of the arrangement of the coil spring 45. More particularly, the coil spring 45 normally, biases the parts upwardly with respect to the fixed outer tube 43; whereby the top surface of the sensing button 48 is normally disposed slightly above the substantially horizontal plane of the flattened top surface of the heating element L. However, when a cooking vessel, or the like, is placed upon the heating element L, the bottom wall thereof engages the top surface of the sensing button 48 as well as a pair of contact members 49 arranged with respect to the sensing button 48 in a triangular pattern, engagement with the bottom wall of the cooking vessel moving all of the parts downwardly with respect to the fixed outer tube 43 against the bias with the coiled spring 45; whereby the top surface of the sensing button 48 is urged into good thermal contact with the bottom surface of the supported cooking vessel by the coiled spring 45. Furthermore, good thermal contact of the bottom of the cooking vessel with the sensing button 48 is assured by the cooperation of the sensing button 48 with the two contact members 49 all arranged in a triangular relationship, the ball and socket connection between the shaft 20 and the members 31, 32 and 35 permitting tilting of these members to insure that the sensing button 48 is in good thermal contact with the bottom wall of the supported cooking vessel.

The temperature sensing resistor RT is arranged in a cooperating centrally disposed cavity formed in the lower surface of the sensing button 48 and is, of course, movable with the sensing button 48 and is arranged in good heat exchange relation therewith for a purpose more fully explained hereinafter, the temperature sensing resistor RT being included in an external electric circuit described more fully hereinafter, the connecting wire elements 70 and 111 extending through the inner tube 42 and outwardly from the bottom end thereof. Since the wiring mentioned is subject to rather a high temperature, it is preferably formed of silver or the like, and is preferably covered with an insulating material capable of withstanding the relatively high temperatures encountered, such as, for example, polytetrafluoroethylene, sold as "Teflon." The sensing resistor RT is formed of material having a high negative temperature co-efficient of resistance such, for example, as the ceramic-like material consisting of sintered aluminum oxide, and an oxide of magnesium, manganese, titanium, iron, nickel, cobalt, zinc, etc., and known as "Thermistor" material. The thermistor RT, for example, has a high resistance of 77,900 ohms at 100° F. but a low resistance of 100 ohms at 500° F.

Figure 3:
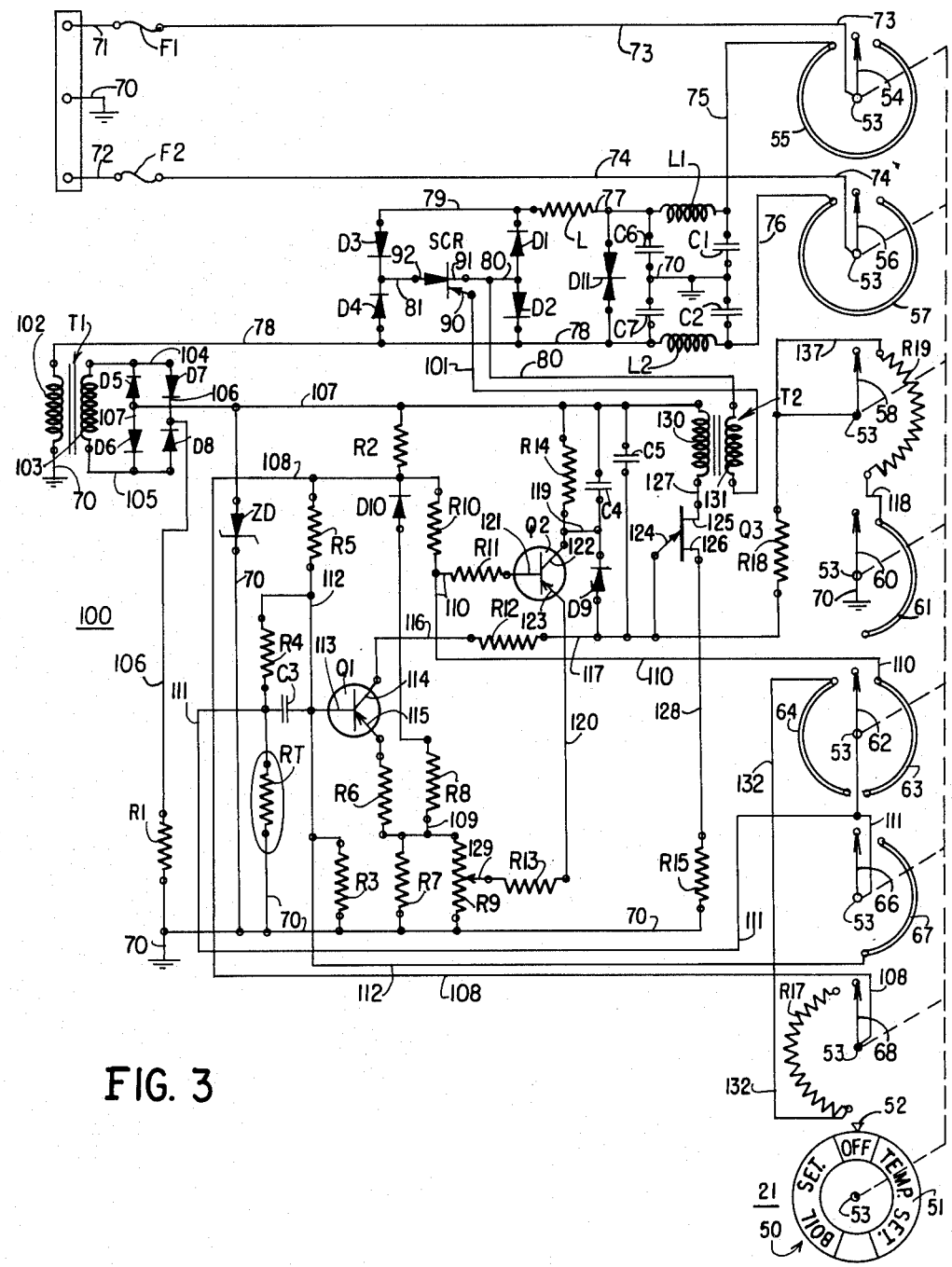
FIG. 3 is a diagram of the electric control circuit for the electric heating unit or hotplate and incorporating therein the temperature sensing unit shown in FIG. 2 and the improved electric control circuit of the present invention.

Referring now to FIG. 3, the manually operable control switch 21 carried by the backsplash 17 and individually associated with the hotplate 16 comprises a rotatably mounted operating shaft 53 carrying a manual dial or knob 50 on the outer end thereof and provided with indicia 51 cooperating with an index marker 52 carried by the backsplash 17. More particularly, the control switch 21 comprises "off," "temperature set," and "boil set" positions that correspond to respective portions of the indicia 51 carried by the dial 50 and cooperating with the index marker 52. In the arrangement, the indicia 51 carried by the dial 50 correspond to different operating ranges and operating conditions for the cooking vessel supported by the hotplate 16. Furthermore, the rotatable shaft 53 of the control switch 21 carries seven wipers 54, 56, 58, 60, 62, 66 and 68 that are simultaneously adjusted as the manual knob 50 is rotated. The wipers 54 and 56, respectively, comprise portions of switches respectively including cooperating conductive segments 55 and 57; the wiper 58 comprises a portion of a rheostat including a resistor R19; the wiper 60 comprises a portion of a switch including a cooperating conductive segment 61 connected by a conductor 118 to one end of the resistor R19, the wiper 60 being connected to ground through a conductor 70; the wiper 62 comprises a portion of a switch including two cooperating conductive segments 63 and 64; the wiper 66 comprises a portion of a switch including a cooperating conductive segment 67; and the wiper 68 comprises a portion of a rheostat including a resistor R17.

Also the circuit network comprises a three-wire Edison source of power supply of 236 volts, single-phase, A.C. including two outside lines 71 and 72 and a grounded neutral line 70, the outside lines 71 and 72 being respectively connected through fuses F1 and F2 to lines 73 and 74 connected to the wipers 54 and 56, respectively. The conductive segments 55 and 57, respectively, terminate two conductors 75 and 76. In the arrangement, when the manual dial 50 occupies its off position, the wipers 54 and 56, respectively, disengage the cooperating conductive segments 55 and 57; when the manual dial 50 is rotated in the clockwise direction out of its off position about 10°, the wipers 54 and 56, respectively, engage the conductive segments 55 and 57 to apply power to the conductor 73 and 74. Such motion of the manual dial 50 also moves the wiper 58 into contact with the resistor R19 and moves the wiper 60 into contact with the cooperating conductive segment 61 to ground one end of the resistor R19 through the conductor 118, the conductive segment 61, the wiper 60 and the ground connection 70. This movement of the manual dial 50 further places the wipers 62 and 66, respectively, in engagement with the cooperating segments 63 and 67 which serves to short out the capacitor C3 and the resistor R4 for a purpose to be explained more fully hereinafter.

As the manual dial 50 is rotated further in a clockwise direction, the wiper 58 moves along the resistor R19 and after an additional 180° of rotation, the wiper 58 disengages the resistor R19 and the wiper 60 disengages the conductive segments 61. With the dial 50 in this position, the wipers 62 and 66 disengage the conductive segments 63 and 67, respectively, to remove the short circuit from around the capacitor C3 and the resistor R4 and the wiper 62 now engages the cooperating conductive segment 64 and the wiper 68 now contacts the resistor R17 to connect the resistor R17 in circuit for a purpose to be explained more fully hereinafter. Continued rotation of the manual dial 50 in the clockwise direction increases the portion of the resistor R17 placed in the circuit and continued rotation will eventually move the parts to the off position illustrated in FIG. 3.

The circuit network further comprises a filter network connected between the main conductors 75 and 76 and including the capacitor C1, C2, C6 and C7 and the inductor coils L1 and L2; more particularly, the capacitors C1 and C2 are connected in series between the conductors 75 and 76, the common connection therebetween being grounded through the conductor 70. The other terminal of the capacitor C1 is connected to the inductor L1 which has the other end thereof connected to a conductor 77; the other terminal of the capacitor C2 is connected to one end of the inductor coil L2 which has the other end thereof connected to a conductor 78. The capacitor C6 and C7 are connected in series with each other and between the conductors 77 and 78, the connection between the capacitors C6 and C7 being grounded through the conductor 70. Also connected between the conductors 77 and 78 is a thyrector D11 which serves to protect the various rectifiers present in the network by acting as a short to all voltages above a predetermined magnitude.

The conductor 77 is also connected to one terminal of the heating element L of the hotplate 16, the other terminal of the heating element L being connected to a conductor 79.

The electrical power supplied to the heating element L, in accordance with the present invention, is controlled by a single silicon controlled rectifier SCR having a gate or control terminal 90 and a pair of power terminals 91 and 92, the rectifier SCR being more particularly a solid state rectifier comprising four rectifying junctions in series, namely, p-n-p-n, with the power terminals 91 and 92 connected to the terminal p- and n-junctions and with the control terminal 90 connected to the intermediate p-junction. The rectifier SCR is characterized by having a high impedance to the flow of current between the terminals 91 and 92 in both directions when no signal is applied to the control terminal 90, and by having a low impedance in one direction between the terminals 91 and 92 when a predetermined pulse or signal is applied to the control terminal 90. In accordance with the present invention, the alternating potential between the conductor 78 and 79 is first rectified before being applied to the rectifier SCR and to this end a rectifying bridge is provided including rectifiers D1, D2, D3 and D4. The rectifiers D1 and D2 have one of the like terminals thereof connected to each other and the other terminals thereof connected, respectively, to the conductors 79 and 78. The rectifiers D3 and D4 likewise have one of the like terminals thereof connected to each other, and the other terminals are connected to the conductor 79 and 78, respectively; one set of like terminals is connected together in the rectifier set D1 and D2 and the other set of like terminals is connected together in the rectifier set D3 and D4. The connection between the like pair of terminals of the rectifiers D1 and D2 is further connected by a conductor 80 to the SCR power terminal 91 and the connection between the like terminals of the rectifiers D3 and D4 is connected by the conductor 81 to the other power terminal 92 of the SCR. The rectifiers D1, D2, D3 and D4 are poled so that the potential applied to the power terminals 91 and 92 of the SCR is always of the same polarity and the current resulting therefrom always tends to flow in the same direction therethrough, whereby the single SCR can be used to control the power delivered to the heating element L for both the negative-going and the positive-going half cycles of the voltage appearing between the conductors 78 and 79.

The conduction of the rectifier SCR and, accordingly, the power fed to the heating element L is controlled by a control circuit generally designated by the numeral 100, the output of the control circuit 100 appearing between the conductor 80 and a conductor 101 connected to the control terminal 90 of the SCR. Power for operating the control circuit 100 is derived from a main power supply transformer T1 having usual primary winding 102 and the usual secondary winding 103, the primary winding 102 being connected between the conductor 78 and the grounded conductor 70 so as to apply the potential therebetween across the primary winding 102. The secondary winding 103 has the terminals thereof connected to the conductors 104 and 105, respectively, between which is connected a rectifying bridge including four rectifiers D5, D6, D7 and D8; one pair of the common terminals of the rectifiers D5 and D6 are connected together and the other terminals are connected respectively to the conductors 104 and 105, the connection between the like terminals of the rectifiers D5 and D6 being made by a conductor 107. One of the pair of like terminals of the rectifiers D7 and D8 is connected by a conductor 106, the other terminals of the rectifiers D7 and D8 being connected to the conductors 104 and 105, respectively. A first type of like terminals of the rectifiers D5 and D6 are connected and the other type of like terminals of the rectifiers D7 and D8 are connected by the conductor 106 so as to form the usual rectifying bridge. The conductor 106 is connected to one terminal of a limiting resistor R1 and the other terminal of the resistor R1 is connected to the grounded conductor 70. In a typical operating example, the A.C. input voltage to the primary winding 102 is 118 volts and the output from the secondary 103 is 150 volts which when applied ot the rectifiers D5, D6, D7 and D8 provides a full wave rectified output therefrom between the conductor 107 and ground. The potential on the conductor 107 is applied across a Zener diode ZD which is characterized by conduction therethrough when a voltage of a specified magnitude is applied across the terminals thereof, the diode ZD being of the type which becomes highly conductive when a potential of 12 volts is applied between the terminals thereof. More specifically, one terminal of the diode ZD is connected to the conductor 107 and the other terminal of the diode ZD is grounded, whereby to provide between the conductor 107 and ground a clipped pulsating D.C. voltage of 12 volts.

Connected to the conductor 107 is one terminal of a resistor R2 having the other terminal thereof connected to a conductor 108. The conductor 108 is also connected to the wiper 68 which makes connection with the resistor R17 when the manual dial 50 is in the "Temp Set" position thereof, one end of the resistor R17 being connected by a conductor 132 to the conductive segment 64 which is adapted to be contacted by the wiper 62 that is connected to a conductor 111. The conductor 111 in turn is connected to one terminal of the thermistor RT, the other terminal of the thermistor RT being grounded so that the 12 volt clipped pulsating D.C. voltage on the conductor 107 is impressed across the resistor R2, a portion of the resistor R17 and the thermistor RT connected in series to ground when the manual dial 50 is in the "Temp Set" position thereof. The conductor 111 is also connected to one terminal of the capacitor C3 and one terminal of the resistor R4, the other terminal of the capacitor C3 and the other terminal of the resistor R4 being connected by a conductor 112 to the base of a transistor Q1. There further is connected between the conductor 108 and the ground potential on the conductor 70 a voltage divider circuit including the resistors R3 and R5, one terminal of the resistor R3 being connected to the ground conductor 70, the other terminal of the resistor R3 being connected by a conductor 112 to one terminal of the resistor R5 and the other terminal of the resistor R5 being connected to the conductor 108. For reasons which will be explained more fully hereinafter, it is desirable in certain instances and particularly when the manual dial 50 is in the "Boil Set" position thereof to provide a short across the capacitor C3 and the resistor R4 and to this end the conductor 111 is connected to the wiper 66 which contacts the cooperating conductive segment 67 when the manual dial 50 is in "Boil Set" position thereof, the conductive segment 67 being connected to the conductor 112. Also when the manual dial 50 is in "Boil Set" position, the conductor 111 is connected via the wiper 62 and the cooperating conductive segment 63 to a conductor 110, the conductor 110 being connected to one terminal of a resistor R10 which has the other terminal thereof connected to the conductor 108 whereby to connect the resistor R10 and the thermistor RT in series with each other between the conductor 108 and ground and to connect the junction therebetween directly to the base of the transistor Q1, whereby the potential at the junction between the resistor R10 and the thermistor R10 is connected directly to the base of the transistor Q1.

The transistor Q1 is provided with the usual base 113, collector 114 and emitter 115, the emitter 115 being connected to one terminal of the resistor R6 which in turn connects to a conductor 109 in a biasing network which includes a resistor R7 and a resistor R8 and a diode D10 connected in series between the conductor 108 and the ground conductor 70, the conductor 109 interconnecting adjacent terminals of the resistors R7 and R8. The collector 114 of the transistor Q1 is connected by a conductor 116 to one terminal of the resistor R12, the other terminal of the resistor R12 being connected to a conductor 117. Connected between the conductors 107 and 117 is a main charging capacitor C5 which is connected in parallel with the primary 130 of a pulse transformer T2 and a unijunction transistor Q3. More specifically, one terminal of the primary winding 130 of the pulse transformer T2 is connected to the conductor 107 and the other terminal thereof is connected to the conductor 127. The unijunction transistor Q3 includes the usual base terminals 125 and 126 and the control terminal 124, the base terminal 125 being connected to the conductor 127, the control terminal 124 being connected to the conductor 117 and the base terminal 126 being connected via a conductor 128 to one terminal of the resistor R15 having the other terminal thereof connected to the grounded conductor 70. When the charge across the capacitor C5 reaches a predetermined critical voltage of, for example, 6 volts, the unijunction transistor Q3 conducts through the primary winding 130 of the pulse transformer T2 and provides in a secondary 131 of the plane transformer T2 a signal pulse between the conductors 80 and 101 connected respectively to the terminals thereof. It is this signal pulse which is applied to the control terminal 90 of the rectifier SCR for controlling the conduction thereof.

The conductor 117 is also connected to one end of the resistor R18 which in turn is connected by a conductor 137 to the wiper 58 and one end of the resistor R19; when the manual dial 50 is in the "Boil Set" position thereof, the wiper 58 is also in electrical contact with a selected point on the resistor R19, the other terminal of the resistor R19 being connected by the conductor 118 to the conductive segment 61 which is connected via the wiper 60 to the grounded conductor 70. The resistor R19 is therefore variable in accordance with the setting of the manual dial 50 and is placed in the charging circuit for the capacitor C5 when the manual dial 50 is in the "Boil Set" position thereof.

The circuit for preventing overheating of the utensil upon the hotplate 16 if the material therein should boil away includes the transistor Q2 which is provided with the usual base 121, collector 122, and emitter 123. The base 121 of the transistor Q2 is connected to one terminal of the resistor R11 which has the other terminal thereof connected to the conductor 110. The bias circuit for the emitter 123 includes a resistor R9 having one terminal connected to the conductor 109 and the other connected to the grounded conductor 70. The resistor R9 has a movable wiper arm 129 in contact therewith and adapted to be moved to any desired adjusted position therealong and connected to one terminal of a resistor R13 which has the other terminal thereof connected by a conductor 120 to the emitter 123. The collector 122 is connected to a conductor 119 which is in turn connected to one terminal of the resistor R14 and one terminal of the capacitor C4, the other terminals of the resistor R14 and the capacitor C4 being connected to the conductor 107. A diode D9 is also connected between the conductors 117 and 119.

Figure 2:
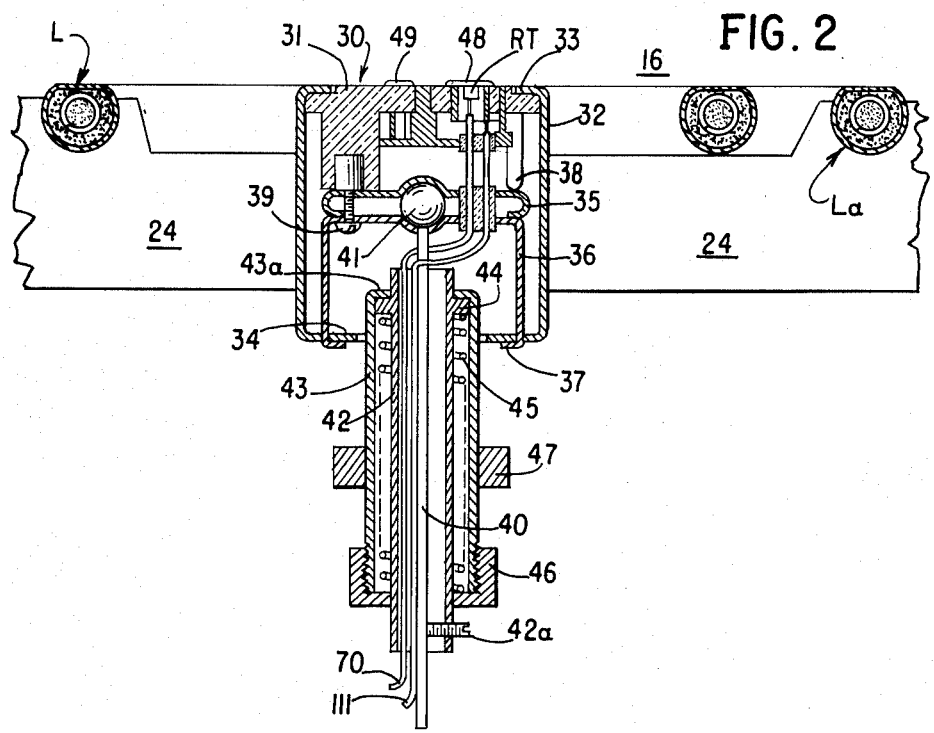
FIG. 2 is a greatly enlarged fragmentary vertical sectional view of one of the electric heating units or hotplates incorporated in the electric range, taken in the direction of the arrows along the line 2—2 of FIG. 1, and illustrating the construction of the temperature sensing unit incorporated therein and forming a part of the electric control circuit.

Referring particularly to FIG. 4 of the drawings wherein there is shown a simplified and rearranged schematic drawing of the parts illustrated in FIGS. 1 to 3, the operation of the control circuit network and the associated parts when the manual dial 50 is in the "Temp Set" position thereof will be described in detail. It will be seen from FIG. 4 that the resistor R17 and the thermistor RT are connected in series circuit in parallel with the diode ZD so that the clipped 12 volts D.C. voltage is developed thereacross. The potential on the conductor 111 at the junction between the resistor R17 and the thermistor RT will vary depending upon the setting of the wiper 68 and the temperature sensed by the thermistor RT; for any given setting of the wiper 68 with respect to the resistor R17, the voltage on the conductor 111 will be relatively high at the beginning of a cooking operation since the resistance of the thermistor RT will be relatively high; conversely, as the temperature sensed by the thermistor RT rises, the resistance thereof decreases due to the negative temperature co-efficient thereof so that the potential on the conductor 111 will decrease as the temperature sensed rises. The change in the potential on the conductor 111 will be connected through the capacitor C3 and the resistor R4 to the base 113 of the transistor Q1 and this change will be amplified by the transistor Q1 and appear in the output thereof on the conductor 116.

The signal from the transistor Q1 is utilized to charge the main capacitor C5, the principal charging circuit for the capacitor C5 being through the thermistor RT and the resistor R3 in parallel, the resistor R4 and the capacitor C3 in parallel, the collector of the transistor Q1 and the resistor R12 to the conductor 117. Inasmuch as the potential on the emitter 115 will be held substantially constant by the bias network therefor including the resistors R2, R7, R8 and R9, the conduction of the transistor Q1 will be controlled by the potential on the base 113 thereof which in turn is responsive to the temperature sensed by the thermistor RT.

Conduction of the transistor Q1 through the collector thereof will tend to charge the capacitor C5 and when the potential thereacross reaches 6 volts, the unijunction transistor Q3 will conduct and produce a voltage pulse in the secondary 131 which is connected to the control terminal 90 of the SCR by the conductor 101. Conduction of the rectifier SCR causes conduction through the heating element L whereby to heat the utensil upon the hotplate 16.

Now assuming that the cook wishes to carry out a medium temperature cooking combination upon the hotplate 16 and that the heating element L thereof is cool, the cook places the cooking vessel and its contents in a supported position on the top surface of the heating element L, whereby the bottom wall of the cooking vessel engages the sensing button 48 and moves the sensing unit 30 into its depressed position so that the sensing button 48 is in good thermal contact with the bottom of the cooking vessel. At this time, the thermistor RT is cool so that it has an exceedingly high resistance. Finally, the cook rotates the manual dial 50 in a clockwise direction from its off position to the "Temp Set" position and approximately midway thereof whereby the wipers 54 and 56 engage the conductive segments 55 and 57, respectively, so as to complete a circuit for operating the various rectifiers D1, D2, D3 and D4 and to effect operation of the control network 100, the rectifiers D5, D6, D7 and D8, the amplifier transistor Q1 and the charging capacitor C5. The output of the rectifiers D5, D6, D7 and D8, is applied to a circuit that can be traced from the conductor 107, the resistor R2, the conductor 108, that portion of the resistor R17 in circuit, the wiper 62 and the conductive segment 64, and the thermistor RT to ground. The values of the various components are chosen so that the transistor Q1 is substantially non-conductive when the temperature of the thermistor RT is that set by the resistor R17.

At the beginning of the cooking operation when the hotplate 16 is cold, the resistance of the thermistor RT will be substantially greater than that of the portion of resistor R17 in circuit whereby to raise the potential on the conductor 111 and on the base 113 of the transistor Q1 and there will, accordingly, be substantial forward bias on and substantial conduction of the transistor Q1 resulting in a large collector current flow to charge the capacitor C5. The greater the difference between the temperature of the thermistor RT and the temperature selected by the cook as determined by the setting of R17, the greater will be the potential on the conductor 111 and the greater the conduction of the transistor Q1; and conversely, the more nearly the temperature of the thermistor RT approaches the temperature selected by the cook, the smaller will be the potential on the conductor 111 and the less the conduction of the transistor Q1; and eventually no conduction of the transistor Q1 will occur when the temperature of the thermistor RT is that set by the cook by the operation of the manual dial 50. The character of the voltages produced can be seen by reference to FIG. 6 of the drawings wherein FIG. 6A represents the A.C. input voltage appearing on the conductors 77–78, FIG. 6B illustrates the pulsating D.C. input to the control circuit appearing between the conductors 107 and 70, FIG. 6C illustrates the output between the conductors 108 and 70, FIG. 6D illustrates the voltage across the temperature sensing thermistor RT, and FIG. 6E illustrates the output from the transistor Q1 when there is a difference between the temperature setting of the resistor R17 and the temperature sensed by the thermistor RT, i.e., when the temperature of the thermistor RT is below that set by the cook using the manual dial 50.

The output from the transistor Q1 and specifically the collector current therefrom, is applied to charge the capacitor C5, the charging circuit for the capacitor C5 being traced from ground through the resistor R3 and the thermistor RT in parallel, the resistor R4, the transistor Q1 and the resistor R12 through the capacitor C5 to the conductor 107. When the temperature sensed by the thermistor RT is substantially below that set by the resistor R17, the transistor Q1 represents a low impedance in the charging path of the capacitor C5 and, accordingly, the capacitor C5 charges rapidly toward the potential appearing on the conductor 107. When the potential across the capacitor C5 reaches a predetermined value of 6 volts, the unijunction resistor Q3 conducts to produce a discharge through the primary winding 130 of the pulse transformer T2. There is illustrated in FIG. 6F of the drawings the character of the output from the secondary winding 131 of the pulse transformer T2 with no load across the terminals thereof, i.e., between the conductors 80 and 101, and there is shown in solid lines in FIG. 6G the character of the output from the winding 131 with the conductors 80 and 101 connected, respectively, to the power terminal 91 and the control terminal 90 of the rectifier SCR. The application of the control signals in FIG. 6G to the control terminal 90 of the rectifier SCR causes conduction thereof as illustrated in FIG. 6H by the shaded area, whereby to cause corresponding conduction through the heating element L consequently to heat quickly the contents of the cooking vessel upon the hotplate 16.

More particularly, the surge of current through the primary winding 130 of the pulse transformer T2 upon conduction of the unijunction transistor Q3 causes a sharp pulse in the secondary winding 131 of the character illustrated in FIG. 6G by solid lines. With the secondary winding 131 connected as illustrated in FIG. 4 of the drawings, the pulses therefrom upon the conduction of the unijunction transistor Q3 are fed to the control terminal or gate 90 of the rectifier SCR. In the absence of the control pulses on the control terminal 90 of the rectifier SCR, the rectifier SCR is non-conductive and there is no voltage applied to and no current through the heating element L. Upon the application of a suitable control signal such as that illustrated by solid lines in FIG. 6G to the control terminal 90 of the rectifier SCR, a path for the flow of current through the heating element is established as follows: From the conductor 77 and the heating element L through the conductor 79 to the rectifier D3, through the rectifier D3 and the conductor 81 and the rectifier SCR and the conductor 80 to the rectifier D2, and through the rectifier D2 to the main conductor 78, it being understood that the full line voltage is applied between the conductors 77 and 78 upon the movement of the switch 21 from the off position to the medium "Temp Set" position thereof. Accordingly, a portion of each half cycle of one set of half cycles of the input voltage, the positive-going half cycles illustrated in FIG. 6A, for example, is applied to the heating element L, substantially all of each positive half cycle of the input voltage being applied thereto by operation of the rectifier SCR when there is a substantial difference between the temperature set by the resistor R17 and the temperature sensed by the thermistor RT as is the case when beginning the cooking operation with the hotplate 16 cool.

On the negative-going half cycles of the main power source, a path for flow of current through the heating element L is established as follows: From the conductor 78 through the rectifier D4 and the conductor 81 to the power terminal 92 of the rectifier SCR, through the rectifier SCR and the conductor 80 and the rectifier D1 to the conductor 79, and from the conductor 79 through the heating element L to the main conductor 77, it being understood that the full line voltage is again applied between the conductors 77 and 78. Accordingly, a portion of each half cycle of the other set of half cycles of the input voltage in FIG. 6A is applied to the heating element L, substantially all of each negative-going half cycle of the input voltage being applied thereto by operation of the rectifier SCR when the difference between the temperature set by the resistor R17 and that sensed by the thermistor RT is large as is the case when beginning the cooking operation with the hotplate 16 cool. There is illustrated in FIG. 6H of the drawings, the voltage wave form applied under these conditions, the power supplied being illustrated by the shaded portions of the power pulses in FIG. 6H.

As the heating element L continues to be fed with the power pulses illustrated in FIG. 6H of the drawings, the hotplate 16 will become heated thereby to heat the cooking vessel to heat the sensing button 48 thereby heating the thermistor RT. As the thermistor RT increases in temperature, the resistance thereof decreases whereby to decrease the potential on the conductor 111 and thus decreasing the signal applied to the base 113 of the transistor Q1. This results in a decrease in the conduction of the transistor Q1 and it therefore presents a greater impedance to the charging current for the capacitor C5 and causes the capacitor C5 to charge at a slower rate; accordingly, the breakdown or conducting voltage of the transistor Q3 needed to provide a control pulse to the control terminal 90 of the rectifier SCR will be reached later, thereby delaying the pulses fed to the control terminal of the rectifier SCR, the pulses, for example, being those llustrated by dashed lines in FIG. 6G. Consequently, a smaller portion of the input power half cycles will be applied by conduction of the rectifier SCR to the heating element L and therefore the heating thereby will be decreased. When the temperature of the cooking vessel reaches that selected by the cook by means of the dial 50, the sensing button 48 will be heated to that temperature and in turn eventually will heat the thermistor RT to a temperature such that the resistance thereof produces a potential on the conductor 111 which substantially interrupts conduction through the collector of the transistor Q1. As a consequence, the impedance of the transistor Q1 will be so great that the charging capacitor C5 will never charge to the breakdown voltage of the transistor Q3 and therefore no control pulses are fed to the control terminal 90 of the rectifier SCR and no heating power is applied to applied to the heating element L.

Subsequently, the temperature of the cooking vessel and its contents subsides when no heat is being supplied by the heating element L so that the temperature of the thermistor RT is reduced bringing about an increase in the resistance thereof with a subsequent increase in the potential on the conductor 111 applied to the base 113 of the transistor Q1, this resulting in a reduction in the effective impedance thereof and therefore an increase in the charging rate of the charging capacitor C5. The capacitor C5 will then charge fast enough to fire the unijunction transistor Q3 prior to the end of the input voltage cycles so that a small amount of power will again be applied to the heating element L until the temperature of the cooking vessel is again raised to that selected.

From the above explanation it will be seen that the charging rate of the charging capacitor C5 is proportional to the difference between the temperature set by the resistor R17 and the temperature sensed by the thermistor RT as determined by the temperature of the cooking vessel on the hotplate 16, the temperature selected by the cook by the adjustment of the dial 50 setting the resistor R17. The time at which the unijunction transistor Q3 conducts to provide output pulses from the transformer T2 is in turn a function of the charging rate of the charging capacitor C5 and is therefore a function of the temperature difference between the thermistor RT and the temperature selected by the cook. A large temperature difference results in a large input to the amplifier transistor Q1 and supplies a large charging current for the capacitor C5 thus causing early conduction of the transistor Q3 thereby to produce the pulses illustrated by the solid lines in FIG. 6G early in the phase of each half cycle of the input voltage. As the temperature of the thermistor RT reaches the temperature selected by the cook, the potential on the conductor 111 becomes smaller, the charging time of the capacitor C5 becomes longer and the transistor Q3 fires later in the cycles of the A.C. voltage, for example, as illustrated by dashed lines in FIG. 6G, thereby to apply a lesser portion of each cycle of the input voltage across the heating element L. When the temperature of the thermistor RT reaches that selected by the cook, the potential on the conductor 111 is such that the impedance of the transistor Q1 substantially prevents charging of the capacitor C5 to a voltage that will fire the transistor Q3 and there will be no signal applied to the control terminal 90 of the rectifier SCR and no portion of the input thereto will be applied to the heating element L.

The control system 100 therefore, upon demand for heat as determined by the potential on the conductor 111, applies a portion of each half cycle of the input voltage across the heating element L, the portion of each half cycle applied to the heating element L varying from all of the half cycle to none thereof, the amount applied being proportional to the difference between the temperature of the thermistor RT and the temperature set by the dial 50 and the resistor R17. As a result, there is a very smooth and continuous application of power when demanded, in the form of 120 pulses per second to the heating element L using a single rectifier SCR, the amount of power applied being proportional to the power input; as a consequence, the control of the heating element L is continuously variable and accurate throughout the temperature range of the control circuit.

There is, however, a temperature lag or thermal delay in the sensing unit 30, i.e., the temperature of the thermistor RT does not immediately reach the temperature of the cooking vessel upon the hotplate 16 because of the time delay in conducting the heat through the various mechanical parts of the sensing unit 30 including the sensing button 48. This thermal delay is most significant when controlling the heating upon the hotplate 16 of a light load which heats very quickly. Accordingly, a lead network has been provided in accordance with the present invention to compensate for this thermal delay, the lead network including the resistors R3, R4 and R5 and the capacitor C3. When starting a heating operation with the cold hotplate 16 and with the switch 21 set in the "Temp Set" position as illustrated in FIG. 4, the temperature of the thermistor RT rises rapidly and the resulting rate of change of the voltage on the conductor 111 causes a current to flow through the capacitor C3 tending to reduce the conduction of the transistor Q1 through the collector thereof and therefore to delay the charging of the capacitor C5 so that the control signals are applied to the rectifier SCR later in each power half cycle than would be the case in the absence of the capacitor C3.

As a result, the circuit described anticipates the heating of the cooking vessel to the temperature set by the resistor R17 and minimizes overshooting of the temperature of the cooking vessel beyond that set by the resistor R17 by reducing the flow of charging current for the capacitor C5 through the transistor Q1.

Referring now particularly to FIG. 5 of the drawings wherein there is shown a simplified and rearranged schematic drawing of the parts illustrated in FIGS. 1 to 3, the operation of the control circuit 100 and the associated parts will be described in detail when the manual dial 50 is placed in the "Boil Set" position thereof, and more particularly, when the dial 50 has been rotated in the clockwise direction from the position illustrated in FIG. 3 through an arc of approximately 90°. It will be seen from FIG. 5 that the resistor R17 is removed from the circuit and a new temperature sensing circuit is established by placing the resistor R10 in series with the thermistor RT. The resistor R19 is also placed in the circuit and a short circuit is provided around the resistor R4 and the capacitor C3. Accordingly, the 12 volt potential determined by the diode ZD will be applied across a voltage divider network including the resistor R10 and the thermistor RT in series with each other, and the potential on the conductor 111 will be applied directly to the base 113 of the transistor Q1. There, accordingly, is a charge circuit for the capacitor C5 through the thermistor RT and the resistor R3 in parallel with each other and then through the transistor Q1 and the resistor R12. Another charging path has been provided for the capacitor C5 through the resistor R19.

Now assuming that the cook wishes to carry out a boiling operation upon the hotplate 16 and that the heating element L thereof is cool, the cook places the cooking vessel and the water therein in an operating position on the top surface of the heating element L, whereby the bottom wall of the cooking vessel engages the sensing button 48 and moves the temperature sensing unit 30 into its depressed position so that the sensing button 48 is in good thermal contact with the bottom of the cooking vessel. At this time, the thermistor RT is cool so that it has an exceedingly high resistance. Finally, the cook rotates the manual dial 50 in the clockwise direction from its off position to approximately the center of the "Boil Set" position, whereby the wipers 54 and 56 engage the conductive segments 55 and 57, respectively, so as to complete a circuit for operating the various rectifiers D1, D2, D3 and D4 and to effect operation of the control circuit network 100 including the rectifiers D5, D6, D7 and D8, the amplifier Q1, the amplifier Q2 and the charging capacitor C5. The output of the rectifiers D5, D6, D7 and D8 is applied to a circuit that can be traced from the conductor 107 through the resistor R2 and the diode ZD to the ground conductor 70 so as to place upon the conductor 108 the clipped pulsating rectified full wave D.C. potential of 12 volts. A primary temperature control circuit is connected between the conductor 108 and the ground conductor 70 and including the resistor R10, the conductor 110, the conductive segment 63, the wiper 62, the conductor 111 and the thermistor RT. The resistor R10 is chosen and has a value such that in cooperation with the other circuit elements including the amplifier transistor Q1 and the charging capacitor C5 it would serve to maintain the temperature of the cooking vessel at 200° F.

At the beginning of the cooking operation when the hotplate 16 is cold, the resistance of the thermistor RT will be very large and, accordingly, the potential on the conductor 111 will be very high. The wiper 66 will be in contact with the conductive segment 67 whereby to connect the conductor 111 to the base 113 of the transistor Q1 and there will be substantial conduction through the transistor Q1 and the resistor R12 rapidly to charge the capacitor C5. In general, the greater the difference between the temperature of the thermistor RT and the predetermined temperature of 200° F. set by the resistor R10, the greater will be the potential applied to the base 113 of the transistor Q1 and the greater the conduction therethrough; and conversely, the more nearly the temperature of the thermistor RT approaches the predetermined temperature set by the resistor R10, namely 200° F., the lower will be the potential upon the conductor 111 and the less the conduction through the transistor Q1. The character of the output signal from the transistor Q1 is illustrated in FIG. 6E of the drawings, it being understood that the various potentials illustrated in FIG. 6A through 6D are present at the points indicated.

The current from the collector 114 of the transistor Q1 is part of the charging current for the capacitor C5, the transistor Q1 being in one of the charging circuits for the capacitor C5. More particularly, the charging circuits for the capacitor C5 can be traced from ground through the conductor 70 through a first branch including the resistor R3 and the thermistor RT in parallel with each other to the base 113 of the transistor Q1, and from the collector 114 of the transistor Q1 through the resistor R12 to the conductor 117, and through the capacitor C5 to the conductor 107; a second charge circuit for the capacitor C5 is from the ground conductor 70 through the wiper 60 and the conductive segment 61 and the conductor 118 to the resistor R19, and then through the wiper 58 and the conductor 137 and the resistor R18 and the conductor 117 and the capacitor C5 to the conductor 107; in the latter charging circuit, it is noted that only that portion of the resistor R19 between the movable contact 58 and the conductor 118 is in the charging circuit. The potential between the conductor 107 and the grounded conductor 70 is derived from the full wave rectifier including the diodes D5, D6, D7 and D8, the output therefrom being a full wave rectified voltage in the form of a pulsating D.C. voltage of the character illustrated in FIG. 6B; the pulsating D.C. voltage is applied across the diode ZD to ground, the diode ZD conducting when the potential of the pulses thereacross reaches a predetermined value of, for example, 12 volts whereby to clip or to limit the voltage appearing thereacross as illustrated in FIG. 6C; consequently, the potential between the conductor 107 and the grounded conductor 70 and applied across the resistor R2, resistor R10 and the thermistor RT in series is the clipped full wave rectified voltage of the type illustrated in FIG. 6C and having a maximum value of 6 volts.

When the thermistor RT is cold, i.e., when the difference between the temperature of the thermistor RT and the predetermined temperature set by the resistor R10 of 200° F. is substantial, the potential applied to the base 113 of the transistor Q1 is high and the transistor Q1 therefore constiutes a low impedance in the charging path of the capacitor C5 and consequently the capacitor C5 charges rapidly toward the potential appearing on the conductor 107. There is a small charging current through that portion of the resistor R19 connected between the conductors 70 and 137 which also aids in charging the capacitor C5. Eventually the charge on the capacitor C5 reaches 6 volts at which time the impedance of the unijunction transistor Q3 changes from a high impedance to a very low impedance and permits rapid discharge of the capacitor C5 through the circuit including the primary winding 130 of the pulse transformer T2 and the transistor Q3.

The surge of current through the primary winding 130 of the pulse transformer 72 upon the conduction of the transistor Q3 causes a pulse in the secondary winding 131 of the character illustrated in FIG. 6G, these pulses being applied to the control gate 90 of the rectifier SCR. In the absence of a control pulse on the gate 90 of the rectifier SCR, the rectifier SCR is non-conducting and there is no voltage applied to the heating element L and no heating current flows therethrough. Upon the application of a suitable control signal such as that illustrated by solid lines in FIG. 6G to the control terminal 90 of the rectifier SCR, a path for flow of current through the heating element L is established as has been described above, both the positive-going half cycles of the applied voltage and the negative-going half cycles thereof providing conduction through the rectifier SCR. Accordingly, a portion of each half cycle of both sets of half cycles of the input voltage is applied to the heating element L, substantially all of each half cycle of the input voltage being applied thereto by operation of the rectifier SCR when beginning the cooking operation with the hotplate 16 cool, the voltage wave form applied under these conditions being illustrated in FIG. 6H of the drawings, the shaded portions of the half cycles illustrating the power developed across the heating element L.

As the heating element L continues to be fed the power pulses as illustrated in FIG. 6G of the drawings, the hotplate 16 will become heated thereby to heat the cooking vessel and to heat the sensing button 48 thereby heating the thermistor RT. As the thermistor RT increases in temperature, the resistance thereof decreases whereby the potential on the conductor 111 that is applied to the base 113 of the transistor Q1 thus reducing the conduction therethrough. A reduced potential on the base 113 of the transistor Q1 will increase the impedance therethrough and cause the capacitor C5 to charge at a slower rate and, accordingly, the breakdown or conduction voltage of 6 volts needed to fire the unijunction transistor Q3 will be reached later, thereby delaying the pulses fed to the control terminal 90 of the rectifier SCR, the pulses, for example, being those illustrated by dashed lines in FIG. 6G. Consequently, a smaller portion of the input voltage power half cycles will be applied by conduction of the rectifier SCR to the heating element L and therefore the heating produced thereby will be decreased.

When the temperature of the cooking vessel reaches the temperature of 200° F. determined by the resistor R10, the sensing button 48 will be heated to that temperature and in turn will heat the thermistor RT to a temperature such that the resistance thereof lowers the potential on the conductor 111 to a value such that the conduction through the transistor Q1 by itself is not sufficient to charge the capacitor C5 to the breakdown voltage of the transistor Q3 during each half cycle. More specifically, the impedance of the transistor Q1 will be so great that the portion of the charging current for the capacitor C5 passing therethrough would never charge the capacitor C5 to the conduction voltage for the transistor Q3, and therefore no control pulses would be fed to the control terminal 90 of the rectifier SCR and no heating power would be applied to the heating element L.

However, the second charging path for the capacitor C5 through the resistor R19 supplies additional charging current for the capacitor C5 and this second charging path essentially assumes control of the circuit 100 when the temperature of the thermistor RT reaches that predetermined by the resistor R10, namely, 200° F. The sum of the charging current through the transistor Q1 and the charging current through the resistor R19 is sufficient to supply enough charging current to charge the capacitor C5 to 6 volts to cause conduction of the transistor Q3 a short time before the end of each power half cycle so that a control signal is applied to the control terminal 90 of the rectifier SCR shortly before the end of each power half cycle so as to supply a small heating current for the heating element L. The amount of power supplied is effectively controlled by the setting of the wiper 58 along the resistor R19, more power being supplied when there is less resistance of the resistor R19 in the circuit, and conversely, less heating power being supplied when more of the resistance of the resistor R19 is in the charging circuit. Therefore, the amount of heat from the heating element L during the boiling of the water in the cooking vessel thereon is controlled by the position of the wiper 58 along the resistor R19.

There also is incorporated in the circuit of FIG. 5 a control network which limits the maximum temperature to which the cooking vessel can be heated should the water therein boil away, this circuit primarily comprising the transistor Q2 and the accompanying circuitry therefor. The bias circuit for the base 121 of the transistor Q2 includes the thermistor RT, the resistor R10 and the resistor R11, the principal source of base current being through the thermistor RT and the resistor R3 in parallel. The bias circuit for the emitter 123 of the transistor Q2 includes the resistor R9 and the resistor R13, only a portion of the resistor R9 being in the bias circuit, namely, that portion between the wiper 129 and the ground conductor 70. The collector 122 of the transistor Q2 is connected to the resistor R14 and therefore the collector current from the transistor Q2 flows through the resistor R14 to the high potential conductor 107; another potential source of current flowing through the resistor R14 is from the ground conductor 70 through a portion of the resistor R19 to the conductor 117 and through the diode D9 to the conductor 119. When the temperature sensed by the thermistor RT is below a predetermined value, for example, 260° F., the conduction of the transistor Q2 and specifically the collector current therefrom through the resistor R14 reduces the potential on the conductor 119 to a value such that the diode D9 cannot conduct. Such a flow of collector current from the transistor Q1 through the resistor R14 also produces a potential thereacross which does not interfere with the operation of the above-described charging circuits for the capacitor C5. However, should the temperature sensed by the thermistor RT reach the predetermined temperature of 260° F., the potential on the conductor 111 falls substantially to place a low voltage on the base of the transistor Q2 which reduces the conduction therethrough and decreases the voltage drop across the resistor R14, thus to increase the potential on the conductor 119 to a value such that the diode D9 conducts. The conduction of the diode D9 through the resistor R14 serves to short circuit or bypass the charging capacitor C5 so that the capacitor C5 cannot charge to the firing potential for the transistor Q3, namely, cannot charge to a potential of 6 volts. As a result, no control signals will be derived from the pulse transformer T2 and no control signals will be applied to the control terminal 90 of the rectifier SCR; consequently, there will be no conduction through the heating element L and no heating of the cooking vessel thereupon.

Subsequently, the temperature of the cooking vessel and its contents will subside when no heat is being supplied by the heating element L so that the temperature of the thermistor RT is reduced bringing about an increase in the resistance thereof and a subsequent increase in the potential on the conductor 111 that is applied to the base 121 of the transistor Q2. The increased potential on the base of the transistor Q2 will increase the conduction thereof so as to develop across the resistor R14 a larger potential which eventually will interrupt conduction of the diode D9 and permit the charging of the capacitor C5 to the conduction voltage for the transistor Q3. Accordingly, the charging capacitor C5 can now charge in the normal manner and will charge to a value such as to fire the transistor Q3 to produce control signals on the control terminal 90 of the SCR. The small amount of power supplied to the heating element L will again raise the temperature of the cooking vessel and the thermistor RT to 260° F. whereby to lower the potential on the conductor 111 to reduce the conduction of the transistor Q2 thus reducing the potential across the resistor R14 and again preventing the charging of the capacitor C5 to the firing potential for the transistor O3.

The temperature at which the conduction of the transistor Q2 is so low as to prevent firing of the transistor Q3 can be adjusted by moving the wiper 129 along the resistor R9. In general, the setting of the slider 129 upon the resistor R9 is a factory adjustment and the specific value of that portion of the resistor R9 put into the circuit and the specific potential applied to the emitter 123 are chosen so as to prevent injury to a cooking vessel upon the heating element L of the hotplate 16 should the liquid therein boil away so as to produce a dry condition within the cooking vessel.

Should the housewife now add cold water to the cooking vessel upon the heating element L so as to reduce the temperature sensed by the thermistor RT to a low value approximating room temperature, the resistance of the thermistor RT will increase abruptly and cause a corresponding increase in the potential on the conductor 111 that is applied to the base of the transistors Q1 and Q2. The increased potential on the base of the transistor Q2 will cause a substantial conduction through the resistor R14 so as to raise the potential thereacross to a value well above the firing potential for the transistor Q3. The increased potential on the base of the transistor Q1 will cause substantial conduction thereof so that it becomes the main source of charging current for the capacitor C5 and therefore assumes effective control of the operation of the control circuit 10. More specifically, the heavy conduction through the transistor Q1 will rapidly charge the capacitor C5 to the firing potential of the transistor Q3 thus to provide control pulses from the transformer T2 to be applied to the control terminal 90 of the rectifier SCR early in each half cycle, such, for example, as illustrated by solid lines in FIGS. 6G and 6H of the drawings. Consequently, the cooking vessel will be rapidly heated to 200° F. at which time the potential on the conductor 111 will be such that the conduction through the transistor Q1 will no longer be the dominant source of charging current of the capacitor C5, but now the current through the variable resistor R19 will become the dominant and controlling source of charging current for the capacitor C5. Should the housewife now add either more cold water or frozen vegetables to the cooking vessel so as again to reduce substantially the temperature thereof and the temperature sensed by the thermistor RT, the transistor Q1 would again become heavily conducting and would assume control of the circuit 100 and would constitute the major source of current for the capacitor C5 and cause rapid heating of the cooking vessel upon the heating element L.

Of course, it will be understood that at the conclusion of any cooking operation, when the manual dial 50 is returned back into its off position, the wipers 54 and 56, respectively, disengage the associated conductive segments 55 and 57 effecting de-energization of all of the circuit elements so that the heating element L is disconnected from the three-wire Edison source.

In the operation of the circuit network, it will be appreciated that the resistors R6 and R13 serve as limiting resistors to limit the emitter current for the transistors Q1 and Q2, respectively. The radio frequency noise generated by the rapid switching action of the rectifier SCR is filtered by the capacitors C1, C2, C6 and C7 and by the chokes L1 and L2 to a level of about 200 microvolts in the broadcast band so that little noise is conducted back into the power lines 71 and 72. Variations in the emitter diode forward voltage drop of the transistor Q1 due to temperature changes are compensated by the diode D10 in the bias circuit therefor.

In accordance with a specific constructional example of the control circuit 100 of FIGS. 3, 4 and 5, the following type and values of circuit components are useful: Q1, 2N1681; Q2, 2N189; Q3, 2N1671A; the rectifiers D1 through D10 are silicon rectifiers; R1, 3,000 ohms; R2, 1,000 ohms; R3, 22,000 ohms; R4, 56,000 ohms; R5, 22,000 ohms; R6, 220 ohms; R7, 560 ohms; R8, 270 ohms; R9, 500 ohms; R10, 5,100 ohms; R11, 1,000 ohms; R12, 2,200 ohms; R13, 2,200 ohms; R14, 47,000 ohms; R15, 470 ohms; R17, 25,000 ohms; R18, 120,000 ohms; R19, 250,000 ohms; C3, 0.5 microfarad; C4, 0.01 microfarad; C5, 0.02 microfarad. It is to be understood that other types of rectifiers may be used in place of the silicon rectifiers D1 through D10, such, for example, as copper oxide rectifiers and the like.

Summarizing the operation of the control system illustrated in FIGS. 3, 4 and 5 and referring first to the operation of the control system when the manual dial 50 is in the "Temp Set" position thereof illustrated particularly in FIG. 4 of the drawings, the thermistor RT is connected in series with the resistor R17 and in parallel with the diode ZD. If temperature sensed by the thermistor RT is less than that set by the resistor R17, the resistance of the thermistor RT will be relatively high to produce a high potential on the conductor 111 that is applied to the base of the transistor Q1. This will produce a forward bias on the emitter of the transistor Q1 resulting in a substantial flow of collector current to the capicitor C5. The capacitor C5 will charge to the firing temperature of the transistor Q3 early in each power half cycle, such, for example, as illustrated by the solid lines in FIG. 6G. The conduction of the transistor Q3 early in each power half cycle will produce a corresponding control signal from the pulse transformer T2 that is applied to the control terminal 90 of the rectifier SCR early in each power half cycle, thus supplying substantially full or high power to the heating element L. As the temperature of the thermistor RT rises, the resistance thereof is reduced thus reducing the potential on the conductor 111 producing less forward bias on the transistor Q1 consequently providing less charging current for the capacitor C5. As a result, the capacitor C5 will charge to the firing potential of the transistor Q3 later in each power half cycle, such as, for example, as illustrated by dashed lines in FIG. 6G. The later firing of the transistor Q3 will produce control signals from the plus transformer T2 applied to the control terminal 90 of the rectifier SCR later in each half cycle to cause later conduction thereof in each half cycle. As a consequence less power will be applied to the heating element L. After the temperature of the cooking vessel contacting the heating element L and the thermistor RT reaches the temperature set by the resistor R17, the control signals produced by the control circuit 100 will be automatically adjusted thereby to occur at a point in each power half cycle such as to maintain the desired temperature set by the resistor R17 by supplying the proper amount of power to the heating element L.

During the heating of the cooking vessel and the thermistor RT from room temperature to that set by the resistor R17, there is always a time lag or delay between the time that the cooking vessel reaches the desired temperature and the time that the thermistor RT reaches the desired temperature. This time delay would cause a substantial overshooting of the temperature set by the resistor R17, particularly when heating light loads, inasmuch as the thermistor RT through the control circuit 100 would demand substantial additional power from the heating element L after the cooking vessel had actually reached the desired temperature, due to the thermal delay of the thermistor RT. By means of the lead network including the resistors R3, R4 and R5 and the capacitor C3, rapid changes of the temperature of the thermistor RT and consequently rapid changes of the potential on the conductor 111 are quickly communicated by the capacitor C3 to the base 113 of the transistor Q1 so that the operation of the transistor Q1 is not controlled only by the voltage on the conductor 111 but also by the rate of change of the voltage thereon, the operation of the RC network being such as to further decrease the conduction of the transistor Q1 when the temperature of the thermistor RT is rising rapidly. More specifically, when the thermistor temperature RT is rising rapidly, the resulting rate of change of the voltage on conductor 111 causes a current to flow through the capacitor C3 which tends to reduce the conduction of the transistor Q1 and thus to reduce substantially the power fed to the heating element L as the thermistor RT approaches and reaches the temperature set by the resistor R17. This substantially eliminates or greatly reduces the overshooting of the temperature set by the resistor R17.

Turning now to the operation of the circuit when the dial 50 is in the "Boil Set" position thereof and referring particularly to FIG. 5 of the drawings, the fixed resistor R10 is placed in series with the thermistor RT, the capacitor C3 and the resistor R4 are shorted out, and the variable resistor R19 is connected in the circuit to provide a second charge path for the charging capacitor C5. The value of the resistor R10 is selected so that for temperatures less than about 200° F., charging current for the capacitor C5 is provided both through the transistor Q1 and through the resistor R19 with the resultant very rapid charging of the capacitor C5 resulting in maximum power input to the heating element L. When the predetermined temperature of 200° fixed by the resistor R10 is reached, the collector current of the transistor Q1 is essentially cut off and the charging of the capacitor C5 is under the control of the resistor R19, the current through the resistor R19 charging the capacitor C5 in each power half cycle so as to supply power to the heating element L in accordance with the setting of the slider 58 along the resistor R19. If cold water or a cold food load such as frozen vegetables are added to the boiling water in the cooking vessel upon the heating element L, the resultant drop in temperature will be detected by the thermistor RT and will increase substantially the resistance thereof and increase the voltage on the conductor 111. This increase in the voltage on the conductor 111 will increase the conduction through the transistor Q1 and thus more rapidly charge the capacitor C5. Additional power will therefore be provided to the heating element L to heat the cold load in contact therewith until the predetermined temperature of 200° F. set by the resistor R10 is reached; then the transistor Q1 will substantially cease conduction and the charging of the capacitor C5 will be substantially exclusively among the control of the resistor R19 which again will supply a predetermined power to the heating element L and thus a predetermined heat to the cooking vessel supported thereon.

As long as the temperature of the thermistor RT is in the normal boil range, the bias on the transistor Q2 as adjusted by means of the resistor R9 is such as to cause sufficient current to flow through the resistor R14 to produce a voltage thereacross greater than the 6 volt firing voltage of the transistor Q3. This will prevent the diode D9 from conducting and the charging circuit of the capacitor C5 will be unaffected. However, should the cooking vessel upon the heating element L boil dry, the temperature of the thermistor RT will rise above the normal boiling value and the resistance thereof will decrease and the potential on the conductor 111 will also decrease. The lowered potential on the conductor 111 is transmitted to the base of the transistor Q2 to decrease the collector current therethrough and through the resistor R14. When the temperature sensed by the thermistor RT reaches approximately 260° F. the collector current of the transistor Q2 will be so little and the voltage drop across the resistor R14 will be so low that the diode D9 will now conduct and will prevent the capacitor C5 from being charged to the 6 volt level required to fire the transistor Q3. Since the transistor Q3 is not fired, there will be no pulses from the transformer T2 and no firing of the rectifier SCR, therefore no power is supplied to the heating element L. By means of this circuit the temperature of the cooking vessel cannot rise about a predetermined value, such as 260° F. as determined by the position of the slider 129 on the resistor R9. The control circuit 100 will operate to maintain the temperature of the cooking vessel on the heating element L at the temperature of 260° F.

Accordingly, the control circuit 100 when the manual dial 50 is in "Boil Set" position thereof will rapidly heat a cold load to a temperature of 200° F. as determined by the value of the resistor R10 by rapidly charging the capacitor C5 through the transistor Q1 and the resistor R19; thereafter the transistor Q1 is rendered substantially non-conducting and the charging of the capacitor C5 is under the control of the resistor R19 to supply a predetermined amount of heat to the load from the heating element L; should a cold load be added to the cooking vessel such as cold water or frozen vegetables, the thermistor R5 will immediately cause conduction of the transistor Q1 so as again rapidly to charge the capacitor C5 to apply maximum heating power to the heating element L and thus maximum heating to the cold load. Should the cooking vessel boil dry, the temperature of the thermistor RT will rise to a value such as to reduce the conduction of the transistor Q2 at a predetermined temperature of, for example, 260° F. so as to cause conduction of the diode D9 and thus prevent the capacitor C5 from ever charging to a value that will supply power to the heating element L; this therefore will avoid food scorching or damage to the cooking utensil by limiting the maximum temperature of the utensil in the boil dry condition.

Accordingly, it is apparent that there has been provided in a heating apparatus of the hotplate type improved circuit networks for selectively controlling the electric power supplied to the hotplate so as to prevent overshooting of a preset temperature when the dial 50 is in the "Temp Set" position, and when the dial 50 is in the "Boil Set" position, rapidly to heat the associated cooking utensil with maximum power to a predetermined temperature such as 200° and then to switch to control in accordance with the setting of the resistor R19 to apply a fixed amount of heat to the cooking vessel and thus determine the degree of boil; and then to apply full power again if the addition of cold water or the cooking load reduces the temperature below 210°; and thereafter if the water should boil away, to limit the maximum temperature of the cooking utensil to avoid food scorching or damage to the utensil.

While there has been described what is at present considered to be the preferred embodiment of the invention, it will be understood that various modifications may be made therein, and it is intended to cover in the appended claims all such modifications that fall within the true spirit and scope of the invention.

What is claimed is:

1. In an electric heating system including an electric heater, a temperature sensing unit arranged to sense the temperature of a medium heated by said heater, a manually operable controller selectively operative to set different desired temperatures of the medium heated by said heater, and a source of electric power; the combination comprising a solid state controlled rectifier having a pair of power terminals and a control terminal and characterized by conduction between the power terminals thereof in response to the application of a control signal to the control terminal thereof, means connecting the power terminals of said solid state controlled rectifier and said heater to said source of electric power so that the power supplied to said heater is dependent upon the state of conduction of said solid state controlled rectifier, a control circuit jointly governed by said temperature sensing unit and said controller and operative to produce a control signal in response to a difference between the temperature sensed by the temperature sensing unit and the temperature setting of said controller, a lead network responsive to rapid changes in the difference between the temperature sensed by said temperature sensing unit and the temperature setting of said controller for modifying the control signal in a sense to minimize overshooting of the temperature set by said controller, and means for impressing the modified control signal upon the control terminal of said solid state controlled rectifier so as selectively to govern the conduction between the power terminals thereof thereby to govern the power supplied to said heater.

2. In an electric heating system comprising an electric heater, a temperature sensing unit arranged to sense the temperature of the medium heated by said heater, a manually operable controller selectively operative to set different desired temperatures of the medium heated by said heater, and a source of alternating electric power; the combination comprising a solid state controlled rectifier having a pair of power terminals and a control terminal and characterized by conduction between the power terminals thereof in response to the application of a control signal to the control terminal thereof, means connecting the power terminals of said solid state controlled rectifier and said heater to said source of electric power so that the power supplied to said heater is dependent upon the state of conduction of said solid state controlled rectifier, a control circuit operated from said power source and jointly governed by said temperature sensing unit and said controller and operative to produce control signals having a predetermined time phase relationship to the corresponding half cycles of said power source in response to a difference between the temperature sensed by said temperature sensing unit and the temperature setting of said controller, a lead network responsive to a rapid change in the difference between the temperature sensed by said temperature sensing unit and the temperature setting of said controller for modifying the time intervals between the control signals and the end of the corresponding half cycles of the power source to minimize overshooting of the temperature set by said controller, and means for impressing the modified control signals upon the control terminal of said solid state controlled rectifier so as selectively to govern the conduction between the power terminals thereof for the time intervals between the application of the control signals to the control terminal mentioned and the end of the corresponding half cycles of the power source, thereby to govern the power supplied to said heater.

3. In an electric heating system comprising an electric heater, a temperature sensing unit arranged to sense the temperature of the medium heated by said heater, a manually operable controller selectively operative to set different desired temperatures of the medium heated by said heater, and a source of alternating electric power; the combination comprising a solid state controlled rectifier having a pair of power terminals and a control terminal and characterized by conduction between the power terminals thereof in response to the application of a control signal to the control terminal thereof, means connecting the power terminals of said solid state controlled rectifier and said heater to said source of electric power so the power supplied to said heater is dependent upon the state of conduction of said solid state controlled rectifier, a time delay circuit operated from said power source and jointly governed by said temperature sensing unit and said controller and operative to produce first control signals having a predetermined time phase delay with respect to the corresponding half cycles of said power source that is inversely proportional to the difference between the temperature sensed by said temperature sensing unit and the temperature setting of said controller, a lead network responsive to a rapid change in the difference between the temperature sensed by said temperature sensing unit and the temperature setting of said conroller for modifying the time phase delay of the first control signals with respect to the corresponding half cycles of said power source to minimize overshooting of the temperature set by said controller, a signal generating circuit operative upon the application of the modified first control signals thereto to produce second control signals having a predetermined time phase delay with respect to the corresponding half cycles of said power source, and means for impressing the second control signals upon the control terminal of said solid state controlled rectifier so as selectively to govern the conduction between the power terminals thereof for the time intervals between the application of the control signals to the control terminal mentioned and the end of the corresponding half cycles of said power source, thereby to govern the power supplied to said heater.

4. In an electric heating system comprising an electric heater, a temperature sensing unit arranged to sense the temperature of the medium heated by said heater, a manually operable controller selectively operative to set different desired temperatures of the medium heated by said heater, and a source of alternating electric power; the combination comprising a solid state controlled rectifier having a pair of power terminals and a control terminal and characterized by conduction between the power terminals thereof in response to the application of a control signal to the control terminal thereof, means connecting the power terminals of said solid state controlled rectifier and said heater to said source of electric power so that the power supplied to said heater is dependent upon the state of conduction of said solid state controlled rectifier, a capacitor charging circuit including a charging capacitor and operated from said power source and having the charging rate thereof jointly governed by said temperature sensing unit and said controller and operative to charge said capacitor toward a predetermined potential at a rate that is proportional to the difference between the temperature sensed by said temperature sensing unit and the temperature setting of said controller, a lead network responsive to a rapid change in the difference between the temperature sensed by said temperature sensing unit and the temperature setting of such controller for reducing the rate of charge of said capacitor to minimize overshooting of the temperature set by said controller, a discharge circuit for said capacitor including a breakdown device characterized by the conduction therethrough in response to the application of the predetermined potential thereacross from said capacitor and operative upon conduction thereof to produce control signals having a predetermined time delay with respect to the corresponding half cycles of the power source, and means for impressing the control signals upon the control terminal of said solid state control rectifier so as selectively to govern the conduction between the power terminals thereof for the time intervals between the application of the control signals to the control terminal mentioned and the end of the corresponding half cycles of said power source, thereby to govern the power supplied to said heater.

5. In an electric heating system comprising an electric heater, a temperature sensing unit arranged to sense the temperature of the medium heated by said heater, a manually operable controller selectively operative to set different desired temperatures of the medium heated by said heater, and a source of alternating electric power; the combination comprising a solid state controlled rectifier having a pair of power terminals and a control terminal and characterized by conduction between the power terminals thereof in response to the application of a control signal to the control terminal thereof, means connecting the power terminals of said solid state controlled rectifier and said heater to said source of electric power so that the power supplied to said heater is dependent upon the state of conduction of said solid state controlled rectifier, a capacitor charging circuit operated from said power source and including a capacitor and a variable impedance in the charging path of said capacitor jointly governed by said temperature sensing unit and said controller and operative to vary said variable impedance inversely proportional to the difference between the temperature sensed by said temperature sensing unit and the temperature setting of said controller, a lead network responsive to a rapid change in the difference between the temperature sensed by said temperature sensing unit and the temperature setting of said controller for increasing said variable impedance to minimize overshooting of the temperature set by said controller, a discharge circuit for said capacitor including a breakdown device characterized by conduction therethrough in response to the application of a predetermined potential thereacross from said capacitor and operative upon conduction thereof to produce control signals having a predetermined time phase delay with respect to the corresponding half cycles of said power source that is both inversely proportional to the difference between the temperature sensed by said temperature sensing unit and the temperature setting of said controller and directly proportional to the rate of change in the difference between the temperature sensed by said temperature sensing unit and the temperature setting of said controller, and means for impressing the control signal upon the control terminal of said solid state controlled rectifier so as selectively to govern the conduction between the power terminals thereof for the time intervals between the application of the control signals to the control terminal mentioned and the end of the corresponding half cycles of said power source, thereby to govern the power supplied to said heater.

6. In an electric heating system comprising an electric heater, a temperature sensing unit arranged to sense the temperature of the medium heated by said heater, a manually operable controller selectively operative to set different desired temperatures of the medium heated by said heater, and a source of alternating electric power; the combination comprising a solid state controlled rectifier having a pair of power terminals and a control terminal and characterized by conduction between the power terminals thereof in response to the application of a control signal to the control terminal thereof, means connecting the power terminals of said solid state controlled rectifier and said heater to said source of electric power so that the power supplied to said heater is dependent upon the state of conduction of said solid state controlled rectifier, a capacitor charging circuit operated from said power source and including a charging capacitor and a variable impedance device therein, a temperature sensing network including said temperature sensing unit and said controller and operative to produce first control signals therefrom proportional to the difference between the temperature sensed by said temperature sensing unit and the temperature setting of said controller, means operated by said temperature sensing network for amplifying the first control signals received therefrom and having the output thereof applied to said variable impedance device to control the impedance thereof inversely proportional to the amplitude of the amplified first control signals, a lead network interconnecting said temperature sensing network and said amplifying means responsive to rapid changes in the difference between the temperature sensed by said temperature sensing unit and the temperature setting of said controller for decreasing the first control signals and the output of said amplifying means, a discharge circuit for said capacitor including a breakdown device characterized by conduction therethrough in response to the application of a predetermined potential thereacross from said capacitor and operative upon conduction thereof to produce second control signals having a predetermined time phase delay with respect to the corresponding half cycles of said power source that is both inversely proportional to the difference between the temperature sensed by said temperature sensing unit and the temperature setting of said controller and directly proportional to the rate of change and the difference between the temperature sensed by said temperature sensing unit and the temperature setting of said controller, and means for impressing the second control signals upon the control terminal of said solid state controlled rectifier so as selectively to govern the conduction between the power terminals thereof for the time intervals between the application of the control signals to the control terminal mentioned and the end of the corresponding half cycles of said power source, thereby to govern the power supplied to said heater.

7. The electric heating system combination set forth in claim 6, wherein said lead network comprises an RC network in said capacitor charging circuit.

8. The electric heating system combination set forth in claim 6, wherein said lead network comprises a capacitor interconnecting said temperature sensing unit and said amplifying means, and said amplifying means is disposed in said capacitor charging circuit and also serves as said variable impedance device.

9. In an electric heating system including an electric heater, a temperature sensing unit arranged to sense the temperature of a medium heated by said heater, a manually operable variable controller selectively operative to set different desired rates of heat input to the medium heated by said heater, and a source of electric power; the combination comprising a solid state controlled rectifier having a pair of power terminals and a control terminal and characterized by conduction between the power terminals thereof in response to the application of a control signal to the control terminal thereof, means connecting the power terminals of said solid state controlled rectifier and said heater to said source of electric power so that the power supplied to said heater is dependent upon the state of conduction of said solid state controlled rectifier, a fixed control device operative to set a desired temperature of the medium heated by said heater, a control circuit jointly governed by said temperature sensing unit and said variable controller and said fixed control device and operative to produce a first control signal in response to a difference between the temperature sensed by said temperature sensing unit and that set by said fixed control device when the temperature sensed by said temperature sensing unit is below that set by said fixed control device and operative to produce a second control signal in response to the setting of said variable controller when the temperature sensed by said temperature sensing unit is above that set by said fixed control device, and means for impressing the control signals produced by said control circuit upon the control terminal of said solid state controlled rectifier so as selectively to govern the conduction between the power terminals thereof and consequently the power supplied to said heater, thereby to supply power to said heater at a first rate when the temperature sensed by said temperature sensing unit is below that set by said fixed control device and to supply power to said heater at a second rate when the temperature sensed by said temperature sensing unit is above that set by said fixed control device.

10. In an electric heating system including an electric heater, a temperature sensing unit arranged to sense the temperature of a medium heated by said heater, a manually operable variable controller selectively operative to set different desired rates of heat input to the medium heated by said heater, and a source of alternating electric power; the combination comprising a solid state controlled rectifier having a pair of power terminals and a control terminal and characterized by conduction between the power terminals thereof in response to the application of a control signal to the control terminal thereof, means connecting the power terminals of said solid state controlled rectifier and said heater to said source of electric power so that the power supplied to said heater is dependent upon the state of conduction of said solid state controlled rectifier, a fixed control device operative to set a desired temperature of the medium heated by said heater, a control circuit operated from said power source and jointly governed by said temperature sensing unit and said variable controller and said fixed control device and operative to produce first control signals having a predetermined time phase relationship to the corresponding half cycles of said power source in response to a difference between the temperature sensed by said temperature sensing unit and that set by said fixed control device when the temperature sensed by said temperature sensing unit is below that set by said fixed control device and operative to produce second control signals having a predetermined time phase relationship to the corresponding half cycles of said power source in response to the setting of said variable controller when the temperature sensed by said temperature sensing unit is above that set by said fixed control device, and means for impressing the control signals produced by said control circuit upon the control terminal of said solid state controlled rectifier so as selectively to govern the conduction between the power terminals thereof for the time intervals between the application of the control signals to the control terminal mentioned and the end of the corresponding half cycles of the power source, thereby to supply power to said heater at a first rate when the temperature sensed by said temperature sensing unit is below that set by said fixed control device and to supply power to said heater at a second rate when the temperature sensed by said temperature sensing unit is above that set by said fixed control device.

11. In an electric heating system including an electric heater, a temperature sensing unit arranged to sense the temperature of a medium heated by said heater, a manually operable variable controller selectively operative to set different desired rates of heat input to the medium heated by said heater, and a source of alternating electric power; the combination comprising a solid state controlled rectifier having a pair of power terminals and a control terminal and characterized by conduction between the power terminals thereof in response to the application of a control signal to the control terminal thereof, means connecting the power terminals of said solid state controlled rectifier and said heater to said source of electric power so that the power supplied to said heater is dependent upon the state of conduction of said solid state controlled rectifier, a fixed control device operative to set a desired temperature of the medium heated by said heater, a time delay circuit operated from said power source and jointly governed by said temperature sensing unit and said variable controller and said fixed control device and operative to produce first control signals having a predetermined time phase delay with respect to the corresponding half cycle of said power source that is inversely proportional to the difference between the temperature sensed by said temperature sensing unit and the temperature setting of said fixed control device when the temperature sensed by said temperature sensing unit is below the temperature setting of said fixed control device and operative to produce second control signals having a predetermined time phase delay with respect to the corresponding half cycles of said power source that is proportional to the setting of said variable controller when the temperature sensed by said temperature sensing unit is above the temperature setting of said fixed control device, a signal generating circuit operated by said time delay circuit and operative upon the application of the first control signals thereto to produce third control signals having a predetermined time phase delay with respect to the corresponding half cycles of said power source and operative upon the application of the second control signals thereto to produce third control signals having a predetermined time phase delay with respect to the corresponding half cycles of said power source and operative upon the application of the second control signals thereto to produce fourth control signals having a predetermined time phase delay with respect to the corresponding half cycles of said power source, and means for impressing the third and the fourth control signals produced by said signal generating circuit upon the control terminal of said solid state controlled rectifier so as selectively to govern the conduction between the power terminals thereof for the time intervals between the application of the control signals to the control terminal mentioned and the end of the corresponding half cycles of said power source, thereby to govern the power supplied to said heater.

12. In an electric heating system including an electric heater, a temperature sensing unit arranged to sense the temperature of a medium heated by said heater, a manually operable variable controller selectively operative to set different desired rates of heat input to the medium heated by said heater, and a source of alternating electric power; the combination comprising a solid state controlled rectifier having a pair of power terminals and a control terminal and characterized by conduction between the power terminals thereof in response to the application of a control signal to the control terminal thereof, means connecting the power terminals of said solid state controlled rectifier and said heater to said source of electric power so that the power supplied to said heater is dependent upon the state of conduction of said solid state controlled rectifier, a fixed control device operative to set a desired temperature of the medium heated by said heater, a capacitor charging circuit operated from said power source and including a charging capacitor having the charging rate thereof jointly governed by said temperature sensing unit and said variable controller and said fixed control device and operative to charge said capacitor toward a predetermined potential at a first rate that is proportional to the difference between the temperature sensed by said temperature sensing unit and the temperature setting of said fixed control device when the temperature sensed by said temperature sensing unit is below the temperature setting of said fixed control device and operative to charge said capacitor toward the predetermined potential at a second rate that is proportional to the temperature setting of said variable controller when the temperature sensed by said temperature sensing unit is above the temperature setting of said fixed control device, a discharge circuit for said capacitor including a breakdown device characterized by conduction thereof in response to the application of the predetermined potential thereacross from said capacitor and operative upon conduction thereof to produce control signals having a predetermined time phase delay with respect to the corresponding half cycles of said power source, and means for impressing the control signals produced by said discharge circuit upon the control terminal of said solid state controlled rectifier so as selectively to govern the conduction between the power terminals thereof for the time intervals between the application of the control signals to the control terminal mentioned and the end of the corresponding half cycles of said power source, thereby to govern the power supplied to said heater.

13. In an electric heating system including an electric heater, a temperature sensing unit arranged to sense the temperature of a medium heated by said heater, a manually operable variable controller selectively operative to set different desired rates of heat input to the medium heated by said heater, and a source of alternating electric power; the combination comprising a solid state controlled rectifier having a pair of power terminals and a control terminal and characterized by conduction between the power terminals thereof in response to the application of a control signal to the control terminal thereof, means connecting the power terminals of said solid state controlled rectifier and said heater to said source of electric power so that the power supplied to said heater is dependent upon the state of conduction of said solid state controlled rectifier, a fixed control device operative to set a desired temperature of the medium heated by said heater, a charging capacitor operatively connected to a source of charging potential operated from said power source, a first capacitor charging circuit for said charging capacitor and including a variable impedance device jointly governed by said temperature sensing unit and said fixed control device and operative to vary the impedance of said variable impedance device inversely proportional to the difference between the temperature sensed by said temperature sensing unit and the temperature setting of said fixed control device when the temperature sensed by said temperature sensing unit is below the temperature setting of said fixed control device, a second capacitor charging circuit for said charging capacitor governed by said variable controller when the temperature sensed by said temperature sensing unit is above the temperature setting of said fixed control device, a discharge circuit for said capacitor including a breakdown device characterized by conduction therethrough in response to the application of a predetermined potential thereacross from said capacitor and operative upon conduction thereof to produce control signals having a predetermined time phase delay with respect to the corresponding half cycles of said power source that is inversely proportional to the difference between the temperature sensed by said temperature sensing unit and the temperature setting of said fixed control device when the temperature sensed by said temperature sensing unit is below the temperature setting of said fixed control device and proportional to the setting of said variable controller when the temperature sensed by said temperature sensing unit is above the temperature setting of said fixed control device, and means for impressing the control signals produced by said discharge circuit upon the control terminal of said solid state controlled rectifier so as selectively to govern the conduction between the power terminals thereof for the time intervals between the application of the control signals to the control terminal mentioned and the end of the corresponding half cycles of said power source, thereby to govern the power supplied to said heater.

14. In an electric heating system including an electric heater, a temperature sensing unit arranged to sense the temperature of a medium heated by said heater, a manually operable variable controller selectively operative to set different desired rates of heat input to the medium heated by said heater, and a source of alternating electric power; the combination comprising a solid state controlled rectifier having a pair of power terminals and a control terminal and characterized by conduction between the power terminals thereof in response to the application of a control signal to the control terminal thereof, means connecting the power terminals of said solid state controlled rectifier and said heater to said source of electric power so that the power supplied to said heater is dependent upon the state of conduction of said solid state controlled rectifier, a fixed control device operative to set a desired temperature of the medium heated by said heater, a charging capacitor operatively connected to a source of charging potential operated from said power source, a first capacitor charging circuit for said capacitor and including a variable impedance device, a temperature sensing network including said temperature sensing unit and said fixed control device and operative to produce first control signals therefrom proportional to the difference between the temperature sensed by said temperature sensing unit and the temperature setting of said fixed control device, means operated by said temperature sensing network for amplifying the first control signals received therefrom and having the output thereof applied to said variable impedance device to control the impedance thereof inversely proportional to the amplitude of the amplified first control signals when the temperature sensed by said temperature sensing unit is below the temperature setting of said fixed control device, a second capacitor charging circuit for said charging capacitor governed by said variable controller when the temperature sensed by said temperature sensing unit is above the temperature setting of said fixed control device, a discharge circuit for said capacitor including a breakdown device characterized by conduction therethrough in response to the application of a predetermined potential thereacross from said capacitor and operative upon conduction thereof to produce second control signals having a predetermined time phase delay with respect to the corresponding half cycles of said power source that is inversely proportional to the temperature between the temperature sensed by said temperature sensing unit and the temperature setting of said fixed control device when the temperature sensed by said temperature sensing unit is below the temperature setting of said fixed control device and proportional to the setting of said variable controller when the temperature sensed by said temperature sensing unit is above the temperature setting of said fixed control device, and means for impressing the second control signals produced by said discharge circuit upon the control terminal of said solid state controlled rectifier so as selectively to govern the conduction between the power terminals thereof for the time intervals between the application of the control signals to the control terminal mentioned and the end of the corresponding half cycles of said power source, thereby to govern the power supplied to said heater.

15. In an electric heating system including an electric heater, a temperature sensing unit arranged to sense the temperature of a medium heated by said heater, and a source of electric power; the combination comprising a solid state controlled rectifier having a pair of power terminals and a control terminal and characterized by conduction between the power terminals thereof in response to the application of a control signal to the control terminal thereof, means connecting the power terminals of said solid state controlled rectifier and said heater to said source of electric power so that the power supplied to said heater is dependent upon the state of conduction of said solid state controlled rectifier, a first fixed control device operative to set a desired temperature of the medium heated by said heater, a second fixed control device operative to set a maximum desired temperature of the medium heated by said heater, a control circuit jointly governed by said temperature sensing unit and said first fixed control device and said second fixed control device and operative to produce control signals in response to the difference between the temperature sensed by said temperature sensing unit and that set by said first fixed control device when the temperature sensed by said temperature sensing unit is below that set by said first fixed control device and operative to interrupt production of control signals when the temperature sensed by said temperature sensing unit is above that set by said second fixed control device, and means for impressing the control signals produced by said control circuit upon the control terminal of said solid state controlled rectifier so as selectively to govern the conduction between the power terminals thereof and consequently the power supplied to said heater, thereby to supply power to said heater when the temperature sensed by said temperature sensing unit is below that set by said second fixed control device and to supply no power to said heater when the temperature sensed by said temperature sensing unit is above that set by said second fixed control device.

16. In an electric heating system including an electric heater, a temperature sensing unit arranged to sense the temperature of a medium heated by said heater, and a source of alternating electric power; the combination comprising a solid state controlled rectifier having a pair of power terminals and a control terminal and characterized by conduction between the power terminals thereof in response to the application of a control signal to the control terminal thereof, means connecting the power terminals of said solid state controlled rectifier and said heater to said source of electric power so that the power supplied to said heater is dependent upon the state of conduction of said solid state controlled rectifier, a first fixed control device operative to set a desired temperature of the medium heated by said heater, a second fixed control device operative to set a maximum desired temperature of the medium heated by said heater, a control circuit operated from said power source and jointly governed by said temperature sensing unit and said first fixed control device and said second fixed control device and operative to produce control signals having a predetermined time phase relationship to the corresponding half cycles of said power source in response to the difference between the temperature sensed by said temperature sensing unit and that set by said first fixed control device when the temperature sensed by said temperature sensing unit is below that set by said first fixed control device and operative to interrupt production of control signals when the temperature sensed by said temperature sensing unit is above that set by said fixed control device, and means for impressing the control signals produced by said control circuit upon the control terminal of said solid state controlled rectifier so as selectively to govern the conduction between the power terminals thereof for the time intervals between the application of the control signals to the control terminal mentioned and the end of the corresponding half cycles of said power source, thereby to supply power to said heater when the temperature sensed by said temperature sensing unit is below that set by said second fixed control device and to supply no power to said heater when the temperature sensed by said temperature sensing unit is above that set by said second fixed control device.

17. In an electric heating system including an electric heater, a temperature sensing unit arranged to sense the temperature of a medium heated by said heater, and a source of alternating electric power; the combination comprising a solid state controlled rectifier having a pair of power terminals and a control terminal and characterized by conduction between the power terminals thereof in response to the application of a control signal to the control terminal thereof, means connecting the power terminals of said solid state controlled rectifier and said heater to said source of electric power so that the power supplied to said heater is dependent upon the state of conduction of said solid state controlled rectifier, a first fixed control device operative to set a desired temperature of the medium heated by said heater, a second fixed control device operative to set a maximum desired temperature of the medium heated by said heater, a time delay circuit operated from said power source and jointly governed by said temperature sensing unit and said first fixed control device and said second fixed control device and operative to produce first control signals having a predetermined time phase delay with respect to the corresponding half cycles of said power source that is inversely proportional to the difference between the temperature sensed by said temperature sensing unit and the temperature setting of said first fixed control device when the temperature sensed by said temperature sensing unit is below the temperature setting of said first fixed control device and operative to interrupt production of control signals when the temperature sensed by said temperature sensing unit is above that set by said second fixed control device, a signal generating circuit operated by said time delay circuit and operative upon the application of the first control signals thereto to produce second control signals having a predetermined time phase delay with respect to the corresponding half cycles of said power source, and means for impressing the second control signals produced by said signal generating circuit upon the control terminal of said solid state controlled rectifier so as selectively to govern the conduction between the power terminals thereof for the time intervals between the application of the second control signals to the control terminal mentioned and the end of the corresponding half cycles of said power source, thereby to supply power to said heater when the temperature sensed by said temperature sensing unit is below that set by said second fixed control device and to supply no power to said heater when the temperature sensed by said temperature sensing device is above that set by said second fixed control device.

18. In an electric heating system including an electric heater, a temperature sensing unit arranged to sense the temperature of a medium heated by said heater, and a source of alternating electric power; the combination comprising a solid state controlled rectifier having a pair of power terminals and a control terminal and characterized by conduction between the power terminals thereof in response to the application of a control signal to the control terminal thereof, means connecting the power terminals of said solid state controlled rectifier and said heater to said source of electric power so that the power supplied to said heater is dependent upon the state of conduction of said solid state controlled rectifier, a first fixed control device operative to set a desired temperature of the medium heated by said heater, a second fixed control device operative to set a maximum desired temperature of the medium heated by said heater, a capacitor charging circuit operated from said power source and including a charging capacitor having the charging rate thereof jointly governed by said temperature sensing unit and said first fixed control device and said second fixed control device and operative to charge said capacitor toward a predetermined potential at a rate that is proportional to the difference between the temperature sensed by said temperature sensing unit and the temperature setting of said first fixed control device when the temperature sensed by said temperature sensing unit is below the temperature setting of said first fixed control device and operative substantially to prevent charging of said capacitor toward the predetermined potential when the temperature sensed by said temperature sensing unit is above the temperature setting of said second fixed control device, a discharge circuit for said capacitor including a breakdown device characterized by conduction thereof in response to the application of the predetermined potential thereacross from said capacitor and operative upon conduction thereof to produce control signals having a predetermined time phase delay with respect to the corresponding half cycles of said power source, and means for impressing the control signals produced by said discharge circuit upon the control terminal of said solid state controlled rectifier so as selectively to govern the conduction between the power terminals thereof for the time intervals between the application of the control signals to the control terminal mentioned and the end of the corresponding half cycles of said power source, thereby to supply power to said heater when the temperature sensed by said temperature sensing unit is below that set by said second fixed control device and to supply no power to said heater when the temperature sensed by said temperature sensing unit is above that set by second fixed control device.

19. In an electric heating system including an electric heater, a temperature sensing unit arranged to sense the temperature of a medium heated by said heater, and a source of alternating electric power; the combination comprising a solid state controlled rectifier having a pair of power terminals and a control terminal and characterized by conduction between the power terminals thereof in response to the application of a control signal to the control terminal thereof, means connecting the power terminals of said solid state controlled rectifier and said heater to said source of electric power so that the power supplied to said heater is dependent upon the state of conduction of said solid state controlled rectifier, a first fixed control device operative to set a desired temperature of the medium heated by said heater, a second fixed control device operative to set a maximum desired temperature of the medium heated by said heater, a charging capacitor operatively connected to a source of charging potential operated from said power source, a capacitor charging circuit for said charging capacitor and including a first variable impedance device jointly governed by said temperature sensing unit and said first fixed control device and operative to vary said first variable impedance inversely proportional to the difference between the temperature sensed by said temperature sensing unit and the temperature setting of said first fixed control device when the temperature sensed by said temperature sensing unit is below the temperature setting of said first fixed control device, a capacitor shorting circuit for said charging capacitor and including a second variable impedance device jointly governed by said temperature sensing unit and said second fixed control device and operative to vary the impedance of said second variable impedance device directly proportional to the difference between the temperature sensed by said temperature sensing unit and the temperature setting of said second fixed control device when the temperature sensed by said temperature sensing unit is between the temperature setting of said first and second fixed control devices and substantially shorting said capacitor when the temperature sensed by said temperature sensing unit is above the temperature setting of said second fixed control device, a discharge circuit for said capacitor including a breakdown device characterized by conduction therethrough in response to the application of a predetermined potential thereacross from said capacitor and operative upon conduction thereof to produce control signals having a predetermined time phase delay with respect to the corresponding half cycles of said power source that is inversely proportional to the difference between the temperature sensed by said temperature sensing unit and the temperature setting of said first fixed control device when the temperature sensed by said temperature sensing unit is below the temperature setting of said first fixed control device and operative to produce no control signals when the temperature sensed by said temperature sensing unit is above the temperature setting of said second fixed control device, and means for impressing the control signals produced by said discharge circuit upon the control terminal of said solid state controlled rectifier so as selectively to govern the conduction between the power terminals thereof for the time intervals between the application of the control signals to the control terminal mentioned and the end of the corresponding half cycles of said power source, thereby to supply power to said heater when the temperature sensed by said temperature sensing unit is below that set by said second fixed control device and to supply no power to said heater when the temperature sensed by said temperature sensing unit is above that set by said second control device.

20. In an electric heating system including an electric heater, a temperature sensing unit arranged to sense the temperature of a medium heated by said heater, and a source of alternating electric power; the combination comprising a solid state controlled rectifier having a pair of power terminals and a control terminal and characterized by conduction between the power terminals thereof in response to the application of a control signal to the control terminal thereof, means connecting the power terminals of said solid state controlled rectifier and said heater to said source of electric power so that the power supplied to said heater is dependent upon the state of conduction of said solid state controlled rectifier, a first fixed control device operative to set a desired temperature of the medium heated by said heater, a second fixed control device operative to set a maximum desired temperature of the medium heated by said heater, a charging capacitor operatively connected to a source of charging potential operated from said power source, a capacitor charging circuit for said capacitor and including a first variable impedance device, a first temperature sensing network including said temperature sensing unit and said first fixed control device and operative to produce first control signals therefrom proportional to the difference between the temperature sensed by said temperature sensing unit and the temperature setting of said first fixed control device, means operated by said first temperature sensing network for amplifying the first control signals received therefrom and having the output thereof applied to said first variable impedance device to control the impedance thereof inversely proportional to the amplitude of the amplified first control signals when the temperature sensed by said temperature sensing unit is below the temperature setting of said first fixed control device, a second temperature sensing network including said temperature sensing unit and said second fixed control device and operative to produce second control signal therefrom proportional to the difference between the temperature sensed by said temperature sensing unit and the temperature setting of said second fixed control device, means operated by said second temperature sensing network for amplifying the second control signals received therefrom and having the output thereof applied to said second variable impedance device to control the impedance thereof inversely proportional to the amplitude of the amplified second control signals when the temperature sensed by said temperature sensing unit is below the temperature setting of said third fixed control device, a discharge circuit for said capacitor including a breakdown device characterized by conduction therethrough in response to the application of a predetermined potential thereacross from said capacitor and operative upon conduction thereof to produce control signals having a predetermined time phase delay with respect to the corresponding half cycles of said power source that is inversely proportional to the difference between the temperature sensed by said temperature sensing unit and the temperature setting of said first fixed control device when the temperature sensed by said temperature sensing unit is below the temperature setting of said first fixed control device and operative to produce no control signals upon operation of said capacitor shorting circuit when the temperature sensed by said temperature sensing unit is above the temperature setting of said second fixed control device, and means for impressing the control signals produced by said discharge circuit upon the control terminal of said solid state controlled rectifier so as selectively to govern the conduction between the power terminals thereof for the time intervals between the application of the control signals to the control terminal mentioned and the end of the corresponding half cycles of said power source, thereby to supply power to said heater when the temperature sensed by said temperature sensing unit is below that set by said second fixed control device and to supply no power to said heater when the temperature sensed by said temperature sensing unit is above that set by said second fixed control device.

21. In an electric heating system including an electric heater, a temperature sensing unit arranged to sense the temperature of a medium heated by said heater, a manually operable variable controller selectively operative to set different desired rates of heat input to the medium heated by said heater, and a source of electric power; the combination comprising a solid state controlled rectifier having a pair of power terminals and a control terminal and characterized by conduction between the power terminals thereof in response to the application of a control signal to the control terminal thereof, means connecting the power terminals of said solid state controlled rectifier and said heater to said source of electric power so that the power supplied to said heater is dependent upon the state of conduction of said solid state controlled rectifier, a first fixed control device operative to set a first desired temperature of the medium heated by said heater, a second fixed control device operative to set a second desired temperature of the medium heated by said heater above said first desired temperature, a control circuit jointly governed by said temperature sensing unit and said variable controller and said fixed control devices and operative to produce first control signals in response to a difference between the temperature sensed by said temperature sensing unit and that set by said first fixed control device when the temperature sensed by said temperature sensing unit is below that set by said first fixed control device and operative to produce second control signals in response to the setting of said variable controller when the temperature sensed by said temperature sensing unit is between that set by said fixed control devices and operative to interrupt production of control signals when the temperature sensed by said temperature sensing unit is above that set by said second fixed control device, and means for impressing the control signals produced by said control circuit upon the control terminal of said solid state controlled rectifier so as selectively to govern the conduction between the power terminals thereof and consequently the power supplied to said heater, thereby to supply power to said heater at a first rate when the temperature sensed by said temperature sensing unit is below that set by said first fixed control device and to supply power to said heater at a second rate when the temperature sensed by said temperature sensing unit is between that set by said fixed control devices and to supply no power to said heater when the temperature sensed by said temperature sensing unit is above that set by said second fixed control device.

22. In an electric heating system including an electric heater, a temperature sensing unit arranged to sense the temperature of a medium heated by said heater, a manually operable variable controller selectively operative to set different desired rates of heat input to the medium heated by said heater, and a source of alternating electric power; a solid state controlled rectifier having a pair of power terminals and a control terminal and characterized by conduction between the power terminals thereof in response to the application of a control signal to the control terminal thereof, means connecting the power terminals of said solid state controlled rectifier and said heater to said source of electric power so that the power supplied to said heater is dependent upon the state of conduction of said solid state controlled rectifier, a first fixed control device operative to set a first desired temperature of the medium heated by said heater, a second fixed control device operative to set a second desired temperature of the medium heated by said heater above said first desired temperature, a control circuit operated from said power source and jointly governed by said temperature sensing unit and said variable controller and said fixed control devices and operative to produce first control signals having a predetermined time phase relationship to the corresponding half cycles of said power source in response to a difference between the temperature sensed by said temperature sensing unit and that set by said first fixed control device when the temperature sensed by said temperature sensing unit is below that set by said first fixed control device and operative to produce second control signals having a predetermined time phase relationship to the corresponding half cycles of said power source in response to the setting of said variable controller when the temperature sensed by said temperature sensing unit is between that set by said fixed control devices and operative to interrupt production of control signals when the temperature sensed by said temperature sensing unit is above that set by said second fixed control device, and means for impressing the control signals produced by said control circuit upon the control terminal of said solid state controlled rectifier so as selectively to govern the conduction between the power terminals thereof for the time intervals between the application of the control signals to the control terminal mentioned and the end of the corresponding half cycles of the power source, thereby to supply power to said heater at a first rate when the temperature sensed by said temperature sensing unit is below that set by said first fixed control device and to supply power to said heater at a second rate when the temperature sensed by said temperature sensing unit is between that set by said fixed control devices and to supply no power to said heater when the temperature sensed by said temperature sensing unit is above that set by said second fixed control device.

23. In an electric heating system including an electric heater, a temperature sensing unit arranged to sense the temperature of a medium heated by said heater, a manually operable variable controller selectively operative to set different desired rates of heat input to the medium heated by said heater, and a source of alternating electric power; a solid state controlled rectifier having a pair of power terminals and a control terminal and characterized by conduction between the power terminals thereof in response to the application of a control signal to the control terminal thereof, means connecting the power terminals of said solid state controlled rectifier and said heater to said source of electric power so that the power supplied to said heater is dependent upon the state of conduction of said solid state controlled rectifier, a first fixed control device operative to set a first desired temperature of the medium heated by said heater, a second fixed control device operative to set a second desired temperature of the medium heated by said heater above said first desired temperature, a time delay circuit operated from said power source and jointly governed by said temperature sensing unit and said variable controller and said fixed control devices and operative to produce first control signals having a predetermined time phase delay with respect to the corresponding half cycles of said power source that is inversely proportional to the difference between the temperature sensed by said temperature sensing unit and the temperature setting of said first fixed control device when the temperature sensed by said temperature sensing unit is below the temperature setting of said first fixed control device and operative to produce second control signals having a predetermined time phase delay with respect to the corresponding half cycles of said power source that is inversely proportional to the difference between the temperature sensed by said temperature sensing unit and the temperature setting of said second fixed control device when the temperature sensed by said temperature sensing unit is below the temperature setting of said second fixed control device and operative to interrupt production of control signals when the temperature sensed by said temperature sensing unit is above that set by said second fixed control device, a signal generating circuit operated by said time delay circuit and operative upon the application thereto of the first control signals and the second control signals to produce respectively third control signals and fourth control signals having a predetermined time phase delay with respect to corresponding half cycles of said power source, and means for impressing the third and the fourth control signals produced by said signal generating circuit upon the control terminal of said solid state controlled rectifier, thereby to supply power to said heater at a first rate when the temperature sensed by said temperature sensing unit is below the temperature setting of said first fixed control device and to supply power to said heater at a second rate when the temperature sensed by said temperature sensing unit is between that set by said fixed control devices and to supply no power to said heater when the temperature sensed by said temperature sensing unit is above that set by said second fixed control device.

24. In an electric heating system including an electric heater, a temperature sensing unit arranged to sense the temperature of a medium heated by said heater, a manually operable variable controller selectively operative to set different desired rates of heat input to the medium heated by said heater, and a source of alternating electric power; a solid state controlled rectifier having a pair of power terminals and a control terminal and characterized by conduction between the power terminals thereof in response to the application of a control signal to the control terminal thereof, means connecting the power terminals of said solid state controlled rectifier and said heater to said source of electric power so that the power supplied to said heater is dependent upon the state of conduction of said solid state controlled rectifier, a first fixed control device operative to set a first desired temperature of the medium heated by said heater, a second fixed control device operative to set a second desired temperature of the medium heated by said heater above said first desired temperature, a capacitor charging circuit operated from said power source and including a charging capacitor having the charging rate thereof jointly governed by said temperature sensing unit and said variable controller and said fixed control devices, said charging circuit being operative to charge said capacitor toward a predetermined potential at a first rate that is proportional to the difference between the temperature sensed by said temperature sensing unit and the temperature setting of said first fixed control device when the temperature sensed by said temperature sensing unit is below the temperature setting of said first fixed control device and operative to charge said capacitor at a second rate determined by the setting of said variable controller when the temperature sensed by said temperature sensing unit is between the temperature settings of said fixed control devices and operative substantially to prevent charging of said capacitor when the temperature sensed by said temperature sensing unit is above the temperature setting of said second fixed control device, a discharge circuit for said capacitor including a breakdown device characterized by conduction thereof in response to the application of the predetermined potential thereacross from said capacitor and operative upon conduction thereof to produce control signals having a predetermined time phase delay with respect to the corresponding half cycles of said power source, and means for impressing the control signals produced by said discharge circuit upon the control terminal of said solid state controlled rectifier so as selectively to govern the conduction between the power terminals thereof for the time intervals between the application of the control signals to the control terminal mentioned and the end of the corresponding half cycles of said power source, thereby to supply power to said heater at a first rate when the temperature sensed by said temperature sensing unit is below that set by said first fixed control device and to supply power to said heater at a second rate when the temperature sensed by said temperature sensing unit is between those set by said fixed control devices and to supply no power to said heater when the temperature sensed by said temperature sensing unit is above that set by said second fixed control device.

25. In an electric heating system including an electric heater, a temperature sensing unit arranged to sense the temperature of a medium heated by said heater, a first manually operable variable controller selectively operative to set different desired temperatures of the medium heated by said heater, a second manually operable variable controller selectively operative to set different desired rates of heat input to the medium heated by said heater, and a source of electric power; the combination comprising a solid state controlled rectifier having a pair of power terminals and a control terminal and characterized by conduction between the power terminals thereof in response to the application of a control signal to the control terminal thereof, means connecting the power terminals of said solid state controlled rectifier and said heater to said source of electric power so that the power supply to said heater is dependent upon the state of conduction of said solid state controlled rectifier, a fixed control device operative to set a desired temperature of the medium heated by said heater, first switching mechanism for establishing a first control circuit jointly governed by said temperature sensing unit and said first variable controller and operative to produce first control signals in response to a difference between the temperature sensed by said temperature sensing unit and the temperature setting of said first variable controller, second switching mechanism for establishing a second control circuit jointly governed by said temperature sensing unit and said second variable control device and said fixed controller and operative to produce second control signals in response to a difference between the temperature sensed by said temperature sensing unit and that set by said fixed control device when the temperature sensed by said temperature sensing unit is below that set by said fixed control device and operative to produce third control signals in response to the setting of said second variable controller when the temperature sensed by said temperature sensing unit is above that set by said fixed control device, and means for impressing the control signals produced by said control circuits upon the control terminal of said solid state controlled rectifier so as selectively to govern the conduction between the power terminals thereof, thereby to govern the power supplied to said heater.

26. In an electric heating system including an electric heater, a temperature sensing unit arranged to sense the temperature of a medium heated by said heater, a first manually operable variable controller selectively operative to set different desired temperatures of the medium heated by said heater, a second manually operable variable controller selectively operative to set different desired rates of heat input to the medium heated by said heater, and a source of alternating electric power; the combination comprising a solid state controlled rectifier having a pair of power terminals and a control terminal and characterized by conduction between the power terminals thereof in response to the application of a control signal to the control terminal thereof, means connecting the power terminals of said solid state controlled rectifier and said heater to said source of electric power so that the power supply to said heater is dependent upon the state of conduction of said solid state controlled rectifier, a fixed control device operative to set a desired temperature of the medium heated by said heater, first switching mechanism for establishing a first control circuit operated from said power source and jointly governed by said temperature sensing unit and said first variable controller and operative to produce first control signals having a predetermined time phase relationship to the corresponding half cycles of said power source in response to a difference between the temperature sensed by said temperature sensing unit and the temperature setting of said first variable controller, second switching mechanism for establishing a second control circuit operated from said power source and jointly governed by said temperature sensing unit and said second variable controller and said fixed control device to produce second control signals having a predetermined time phase relationship to the corresponding half cycles of said power source in response to a difference between the temperature sensed by said temperature sensing unit and that set by said fixed control device when the temperature sensed by said temperature sensing unit is below that set by said fixed control device and operative to produce third control signals having a predetermined time phase relationship to the corresponding half cycles of said power source in response to the setting of said second variable controller when the temperature sensed by said temperature sensing unit is above that set by said fixed control device, and means for impressing the control signals produced by said control circuits upon the control terminal of said solid state controlled rectifier so as selectively to govern the conduction between the power terminals thereof for the time intervals between the application of the control signals to the control terminal mentioned and the end of the corresponding half cycles of the power source, thereby to govern the power supplied to said heater.

27. In an electric heating system including an electric heater, a temperature sensing unit arranged to sense the temperature of a medium heated by said heater, a first manually operable variable controller selectively operative to set different desired temperatures of the medium heated by said heater, a second manually operable variable controller selectively operative to set different desired rates of heat input to the medium heated by said heater, and a source of alternating electric power; the combination comprising a solid state controlled rectifier having a pair of power terminals and a control terminal and characterized by conduction between the power terminals thereof in response to the application of a control signal to the control terminal thereof, means connecting the power terminals of said solid state controlled rectifier and said heater to said source of electric power so that the power supply to said heater is dependent upon the state of conduction of said solid state controlled rectifier, a fixed control device operative to set a desired temperature of the medium heated by said heater, first switching mechanism for establishing a first control circuit operated from said power source and jointly governed by said temperature sensing unit and said first variable controller and operative to produce first control signals having a predetermined time phase relationship to the corresponding half cycles of said power source in response to a difference between the temperature sensed by said temperature sensing unit and the temperature setting of said first variable controller, a lead network in said first control circuit responsive to a rapid change in the difference between the temperature sensed by said temperature sensing unit and the temperature setting of said first variable controller for changing the time intervals between the first control signals and the end of the corresponding half cycles of the power source to minimize overshooting the temperature set by said first variable controller, second switching mechanism for establishing a second control circuit operated from said power source and jointly governed by said temperature sensing unit and said second variable controller and said fixed control device to produce second control signals having a predetermined time phase relationship to the corresponding half cycles of said power source in response to a difference between the temperature sensed by said temperature sensing unit and that set by said fixed control device when the temperature sensed by said temperature sensing unit is below that set by said fixed control device and operative to produce third control signals having a predetermined time phase relationship to the corresponding half cycles of said power source in response to the setting of said second variable controller when the temperature sensed by said temperature sensing unit is above that set by said fixed control device, and means for impressing the control signals produced by said control circuits upon the control terminal of said solid state controlled rectifier so as selectively to govern the conduction between the power terminals thereof for the time intervals between the application of the control signals to the control terminal mentioned and the end of the corresponding half cycles of the power source, thereby to govern the power supplied to said heater.

28. In an electric heating system including an electric heater, a temperature sensing unit arranged to sense the temperature of a medium heated by said heater, a manually operable controller selectively operative to set different desired temperatures of the medium heated by said heater, and a source of alternating electric power; the combination comprising four rectifiers connected in a full-wave rectifying bridge including a leg arranged so that D.C. current flows therethrough in the same direction during both the positive-going and the negative-going half cycles of the power applied to said bridge, a solid state controlled rectifier having a pair of power terminals and a control terminal and characterized by conduction between the power terminals thereof in only one direction in response to the application of a control signal to the control terminal thereof, means connecting said power terminals in said leg of said rectifying bridge with said solid state controlled rectifier poled for conduction in the direction of D.C. current flow through said leg, means connecting said rectifying bridge and said heater and said source of alternating electric power so that the power supplied to said heater is dependent upon the state of conduction of said solid state controlled rectifier, a control circuit operated from said power source and jointly governed by said temperature sensing unit and said controller and operative to produce control signals having a predetermined time phase relationship to the corresponding half cycles of said power source in response to a difference between the temperature sensed by said temperature sensing unit and the temperature setting of said controller, and means for impressing the control signals produced by said control circuit upon the control terminal of said solid state controlled rectifier so as selectively to govern the conduction between the power terminals thereof for the time intervals between the application of the control signals to the control terminal mentioned and the end of the corresponding half cycles of the power source, thereby to govern the power supplied to said heater during both the positive-going and the negative-going half cycles of said power source through said solid state controlled rectifier.

29. The electric heating system combination set forth in claim 28, wherein said four rectifiers are silicon diode rectifiers, and said solid state controlled rectifier is a silicon controlled rectifier.

30. In an electric heating system including an electric heater, a temperature sensing unit arranged to sense the temperature of a medium heated by said heater, a manually operable controller selectively operative to set different desired temperatures of the medium heated by said heater, and a pair of conductors connected to a source of alternating electric power; the combination comprising first and second rectifiers each having a first terminal and a second terminal, means connecting said first terminals of said first and second rectifiers to each other and connecting said second terminals thereof respectively to said conductors, third and fourth rectifiers each having a first terminal and a second terminal, means connecting said second terminals of said third and fourth rectifiers to each other and connecting said first terminals thereof respectively to said conductors, a solid state controlled rectifier having a pair of power terminals and a control terminal and characterized by conduction between the power terminals thereof in only one direction in response to the application of a control signal to the control terminal thereof, means connecting one of said power terminals of said solid state controlled rectifier to said first terminals of said first and second rectifiers and the other of said power terminals of said solid state controlled rectifier to said second terminals of said third and fourth rectifiers, means connecting said electric heater in circuit in one of said conductors so that the power supplied to said electric heater is dependent upon the state of conduction of said solid state controlled rectifier, a control circuit operated from said power source and jointly governed by said temperature sensing unit and said controller and operative to produce control signals having a predetermined time phase relationship to the corresponding half cycles of said power source in response to a difference between the temperature sensed by said temperature sensing unit and the temperature setting of said controller, and means for impressing the control signals produced by said control circuit upon the control terminal of said solid state controlled rectifier so as selectively to govern the conduction between the power terminals thereof for the time intervals between the application of the control signals to the control terminal mentioned and the end of the corresponding half cycles of the power source, thereby to govern the power supplied to said heater during both the positive-going and the negative-going half cycles of said power source through said solid state controlled rectifier.

References Cited by the Examiner

UNITED STATES PATENTS

| | | | |
|---|---|---|---|
| 3,051,813 | 8/1962 | Busch et al. | 219—489 |
| 3,141,948 | 7/1964 | Young | 219—494 |
| 3,161,759 | 12/1964 | Cambill et al. | 219—501 |

RICHARD M. WOOD, *Primary Examiner.*

UNITED STATES PATENT OFFICE
CERTIFICATE OF CORRECTION

Patent No. 3,221,143                            November 30, 1965

George F. Skala

It is hereby certified that error appears in the above numbered patent requiring correction and that the said Letters Patent should read as corrected below.

Column 29, line 42, after "said" insert -- second --.

Signed and sealed this 7th day of February 1967.

(SEAL)
Attest:

ERNEST W. SWIDER                        EDWARD J. BRENNER
Attesting Officer                               Commissioner of Patents